US011232134B2

(12) United States Patent
Sharma et al.

(10) Patent No.: US 11,232,134 B2
(45) Date of Patent: Jan. 25, 2022

(54) CUSTOMIZED VISUALIZATION BASED INTELLIGENCE AUGMENTATION

(71) Applicant: ACCENTURE GLOBAL SOLUTIONS LIMITED, Dublin (IE)

(72) Inventors: Vibhu Saujanya Sharma, Bangalore (IN); Vikrant Kaulgud, Pune (IN); Sanjay Podder, Thane (IN); Rohit Mehra, Rohini (IN); Poulami Debnath, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 365 days.

(21) Appl. No.: 16/591,187

(22) Filed: Oct. 2, 2019

(65) Prior Publication Data

US 2020/0034374 A1 Jan. 30, 2020

Related U.S. Application Data

(63) Continuation of application No. 15/823,179, filed on Nov. 27, 2017, now Pat. No. 10,467,262.

(30) Foreign Application Priority Data

Nov. 29, 2016 (IN) ............................ 201641040713
Dec. 21, 2016 (IN) ............................ 201641043670

(51) Int. Cl.

*G06F 16/28* (2019.01)
*G06Q 10/10* (2012.01)
*G06Q 10/06* (2012.01)
*G06N 20/00* (2019.01)
*G06F 16/248* (2019.01)
*G06F 9/451* (2018.01)
*G06N 5/02* (2006.01)

(Continued)

(52) U.S. Cl.

CPC ........... *G06F 16/287* (2019.01); *G06F 9/451* (2018.02); *G06F 16/248* (2019.01); *G06F 16/288* (2019.01); *G06N 5/022* (2013.01); *G06N 5/025* (2013.01); *G06N 20/00* (2019.01); *G06Q 10/063118* (2013.01); *G06Q 10/103* (2013.01); *G06F 8/10* (2013.01); *G06F 8/73* (2013.01)

(58) Field of Classification Search

CPC ...... G06F 16/287; G06F 9/451; G06F 16/288; G06N 20/00

See application file for complete search history.

(56) References Cited

U.S. PATENT DOCUMENTS

2011/0320470 A1 12/2011 Williams et al.
2015/0269525 A1 9/2015 Hazy

*Primary Examiner* — Truong V Vo
(74) *Attorney, Agent, or Firm* — Mannava & Kang, P.C.

(57) ABSTRACT

According to an example, customized visualization based intelligence augmentation may include accessing, based on a user request, a domain model, and mapping the user request to the domain model. Based on the mapping, a guided query that includes a relevant refinement question may be generated. A response may be received to the refinement question. Based on the received response, a refined user request may be generated, and classified into an intelligence augmentation category. Based on the classification, an intelligence augmentation analyzer may be accessed to analyze the refined user request to generate an insight output that is classified to a visualization. Based on the classification of the insight output to the visualization, responsive to the user request, a display of the visualization may be generated.

20 Claims, 45 Drawing Sheets

(51) Int. Cl.

| | |
|---|---|
| *G06F 8/10* | (2018.01) |
| *G06F 8/73* | (2018.01) |

Retrieving the starting point to traverse the domain model from the REQUEST- these starting nodes may be called Nodes of Interest

WHO IS WORKING ON THE SAME FILE AS I AM

*Nodes of Interest identified:* `Developer, File`

USER INTERFACE 106

USER INTERFACE 106

USER INTERFACE
106

USER INTERFACE 106

CUSTOMIZED VISUALIZATION BASED INTELLIGENCE AUGMENTATION

PRIORITY

This application is a Continuation of commonly assigned and co-pending U.S. patent application Ser. No. 15/823,179, filed Nov. 27, 2017, which claims priority to Indian Application Serial No. 201641040713, filed Nov. 29, 2016, and entitled "CUSTOMIZED VISUALIZATION BASED INTELLIGENCE AUGMENTATION", and Indian Application Serial No. 201641043670, filed Dec. 21, 2016, and entitled "INTENT AND BOT BASED QUERY GUIDANCE" (also filed as U.S. application Ser. No. 15/421,928 on Feb. 1, 2017), which are incorporated by reference in their entireties.

BACKGROUND

In a work environment, a user may perform research to address any of a plurality of inquiries to complete a task. For example, a user may invoke a search engine to ascertain information needed to complete a task. The ascertained information may be displayed in a variety of formats for further analysis by the user.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
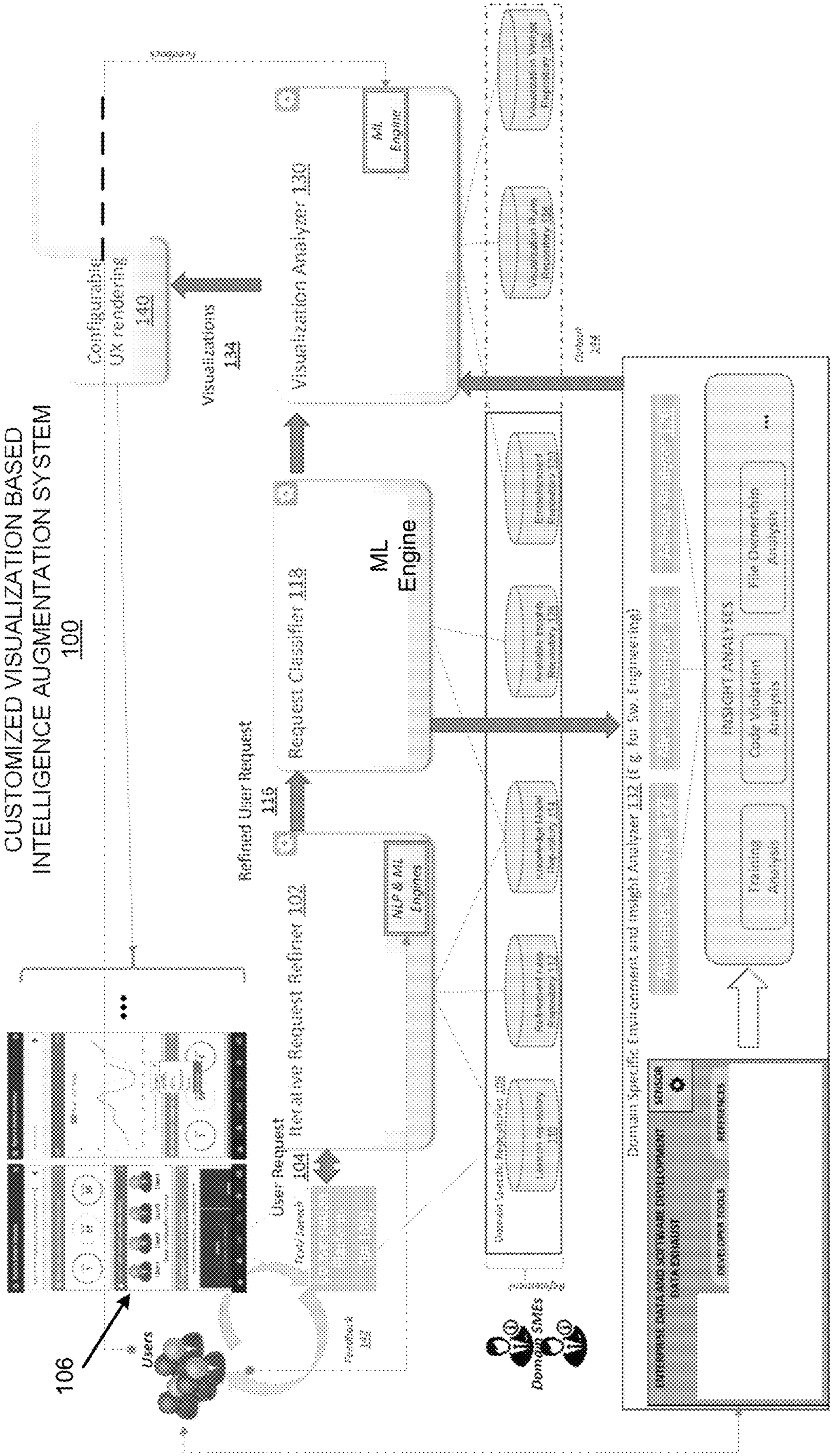
FIG. 1 illustrates an architecture of a customized visualization based intelligence augmentation system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A customized visualization based intelligence augmentation system, a method for customized visualization based intelligence augmentation, and a non-transitory computer readable medium having stored thereon machine readable instructions for customized visualization based intelligence augmentation are disclosed herein. The system, method, and non-transitory computer readable medium disclosed herein provide an interactive insight visualization framework that may be used by a user to enhance the user's knowledge about a past and a present state, trends, and alert-worthy situations, and additional information needed for the user to perform a job assigned to the user in an effective manner. These aspects of enhancement may thus augment the collective and individual intelligence of a workforce that includes a plurality of users including the user.

With respect to a past and present state, for the system, method, and non-transitory computer readable medium disclosed herein, for a specific domain, a state may be described as observable parameters that may change their values from time to time. For example, in a software development environment, the state may refer to a number of code quality violations at a particular instance in time. If this information is considered at a current time, a state may refer to as a present state. In this regard, past commits and relevant violations may be referred to as a past state.

A trend for the system, method, and non-transitory computer readable medium disclosed herein may be described as a pattern observed over a period of time. The pattern may refer to a change in behaviors of certain parameters. For example, in a software development environment, a trend may be described as variations in code quality violations over time for a particular developer.

An alert for the system, method, and non-transitory computer readable medium disclosed herein may be described as a situation that needs immediate user attention.

Additional information for the system, method, and non-transitory computer readable medium disclosed herein may refer to helpful embellishments. For example, an embellishment may be described as helpful visual elements that are not defined in a result set directly, but can be derived based upon certain rules set by subject matter experts (SMEs).

For the system, method, and non-transitory computer readable medium disclosed herein, the work environment for any domain (e.g., the development environment in a software project) may be a relevant source of information and insights about the trends and progress of a task at hand. The work environment may be used to extract answers to user requests for intelligence augmentation. In this regard, the system, method, and non-transitory computer readable medium disclosed herein may provide for the conduction of a guided exchange (e.g., a conversation) with a user to refine and elaborate the user's request for such intelligence augmentation. The insights from the work environment may be used to create conversation-specific, interactive, and customized auto-generated insight cards which are rendered in a configurable user interface (UI).

An insight card for the system, method, and non-transitory computer readable medium disclosed herein may facilitate visualization of the useful and intelligent conclusions in a visually relevant format. A visualization may make the information associated therewith easier to digest, where the visualization does not merely include a display of factual data in its original form.

The system, method, and non-transitory computer readable medium disclosed herein may include an iterative request refiner to intelligently match portions of a domain specific knowledge model to a user request. The intelligent matching of the domain specific knowledge model to the user request may further facilitate the elaboration of other related aspects which may help refine the user's request. For example, the user's request may be refined by augmentation with a set of follow-up questions. A knowledge model may be described as a domain model for a particular domain comprising of entities and relationships between the entities.

The system, method, and non-transitory computer readable medium disclosed herein may include a request classifier that uses natural language processing (NLP) to classify the refined request into one of three intelligence augmentation categories that include awareness, alert, and advice. Based on the classification, the request classifier may invoke a relevant domain insight engine (e.g., an awareness analyzer, an alerting analyzer, or an advice analyzer). Based on the elements of the domain's knowledge model present in the request, the request classifier may infer a set of embellishments which may be pertinent to further enhance the response.

With respect to the request classifier, awareness may be described as a request for information on a past or present portion of the state of a project. An alert may be described as a request which specifies some information to be provided when a condition based on a portion of the assumed state of the system becomes true in the future. Further, advice may be described as a request for information (which may be a portion of the assumed state or a set of actions) related to an assumed and/or hypothetical state of the system, or for an action that may occur in future (i.e., related to a past or present state of the system).

With respect to classification of a refined request as awareness, advice, or an alert, an initial classification may be based upon the presence or absence of certain keywords and/or sequence of keywords (e.g., bigrams, trigrams, etc.). For example, commonly occurring keywords for an alert may include notify me (bigram), notify, alert me, alert, warn me, raise an alarm (trigram), interrupt me, etc. Commonly occurring keywords for an advice may include suggest me, suggest, recommend me, recommend, etc. With respect to awareness, if a request is not classified as either an alert or an advice, the request may be tagged under awareness.

Further to initial classification based upon the aforementioned rules, based upon the domain model, a corpus of the relevant questions, manually classified as awareness, advice, and alert, may be used to initially train a machine learning model that extracts commonly used keywords. Based on an interaction of a user with the system disclosed herein, the composite requests may be classified as described above.

The system, method, and non-transitory computer readable medium disclosed herein may include a visualization analyzer to utilize the outputs from a domain specific environment and insights analyzer (that includes the awareness analyzer, the alerting analyzer, and the advice analyzer) to create the relevant results for a user request. The insight analysis output may be mapped to a request-specific mix of customized visualizations which are augmented with embellishments to assist a user. The embellished visualizations may be rendered in a configurable and interactive UI.

The system, method, and non-transitory computer readable medium disclosed herein may provide for visualization embellishment (e.g., modification) for visualizations that are displayed responsive to a user request. For example, a visualization displayed responsive to a user request may include information that is irrelevant to a user request, which may thus result in unnecessary utilization of computing resources, inaccuracies with respect to the generated results, and thus, inaccuracies with respect to responses to the user request. In this regard, the system, method, and non-transitory computer readable medium disclosed herein may provide customized visualization based intelligence augmentation to reduce the unnecessary waste of computing resources, eliminate inaccuracies with respect to the generated results, and thus, eliminate inaccuracies with respect to responses to the user request. For example, the system, method, and non-transitory computer readable medium disclosed herein may include the analysis of a user request that includes an inquiry. Based on the user request, a domain model may be accessed from a domain specific repository, and the user request may be mapped to the accessed domain model. Based on the mapping of the user request to the domain model, guided queries that include relevant refinement questions associated with the user request may be generated. Based on received responses to the refinement questions, a refined user request may be generated. The refined user request may be classified into an intelligence augmentation category of a plurality of intelligence augmentation categories. Based on the classification of the refined user request into the intelligence augmentation category, an intelligence augmentation analyzer associated with the intelligence augmentation category may be accessed. Based on an analysis of the refined user request by the intelligence augmentation analyzer, an insight output may be generated. The insight output may be classified to a plurality of visualizations. Based on the classification of the insight output to the plurality of visualizations, a plurality of visualization rules may be determined. Based on an analysis of the insight output with respect to the plurality of visualization rules, at least one embellishment (e.g., modification) associated with each of the plurality of visualizations may be determined. Based on the classification of the insight output to the plurality of visualizations, information associated with the at least one determined embellishment may be inserted into each of the plurality of visualizations. Further, responsive to the user request, a display of the plurality of visualizations may be generated and include the information associated with the at least one determined embellishment. Thus, the customized visualization that is displayed may be based on intelligence augmentation to reduce the unnecessary waste of computing resources with respect to display of visualizations that may be irrelevant to the user request, eliminate inaccuracies with respect to the generated results, and thus, eliminate inaccuracies with respect to responses to the user request.

In some examples, elements of the customized visualization based intelligence augmentation system may be machine readable instructions stored on a non-transitory computer readable medium. In this regard, the customized visualization based intelligence augmentation system may include or be a non-transitory computer readable medium. In some examples, the elements of the customized visualization based intelligence augmentation system may be hardware or a combination of machine readable instructions and hardware.

FIG. 1 illustrates an architecture of a customized visualization based intelligence augmentation system 100 (hereinafter "system 100"), according to an example of the present disclosure.

Referring to FIG. 1, the system 100 may include an iterative request refiner 102 to intelligently match (e.g., by mapping) portions of a domain specific knowledge model to a user request 104. The intelligent matching of the domain specific knowledge model to the user request 104 may further facilitate the elaboration of other related aspects which may facilitate the refinement of the user request 104. For example, the user request 104 may be refined by augmenting with a set of follow-up questions.

The user request 104 may be related to awareness with respect to a current project in which the user is involved, with respect to what has occurred in the project, an alert related to the occurrence of certain events, guidance or advice with respect to certain situations (e.g., real or hypothetical) that may need mitigation, etc. Generally, the user request 104 may be related to any aspects related to a project the user is involved in, the user's occupation, a task being performed by the user, or any other aspect related to the user. The user request 104 may be entered via a user interface 106, where the user interface 106 may provide a platform for receiving the user request and for further interaction with a user associated with the user request 104.

The user request 104 may be typed, spoken, or otherwise entered via the user interface 106.

The iterative request refiner 102 may extract other relevant dimensions with respect to the user request 104. Other relevant dimensions may refer to traversing the domain model and extracting adjacent nodes (entities) as disclosed herein with respect to FIG. 3. Other relevant dimensions may also incorporate the retrieval of instance values of entities at runtime, where the instance values may vary with each iteration. With respect to the extraction of these instance values, subject matter expert specified rules for grouping of instances may be applied on certain attributes of these instances. The extracted information may then be used in a guided conversation as disclosed herein. Furthermore, this set of instance values may be presented to the user associated with the user request 104, where the user may be prompted for selection of other aspects to thus take the guided conversation forward.

The iterative request refiner 102 may implement a guided conversation with the user associated with the user request 104 to generate relevant refinement questions. For example, based on an analysis of the user request 104, the iterative request refiner 102 may implement the guided conversation to generate the relevant refinement questions to further refine the user request 104.

Figure 5:
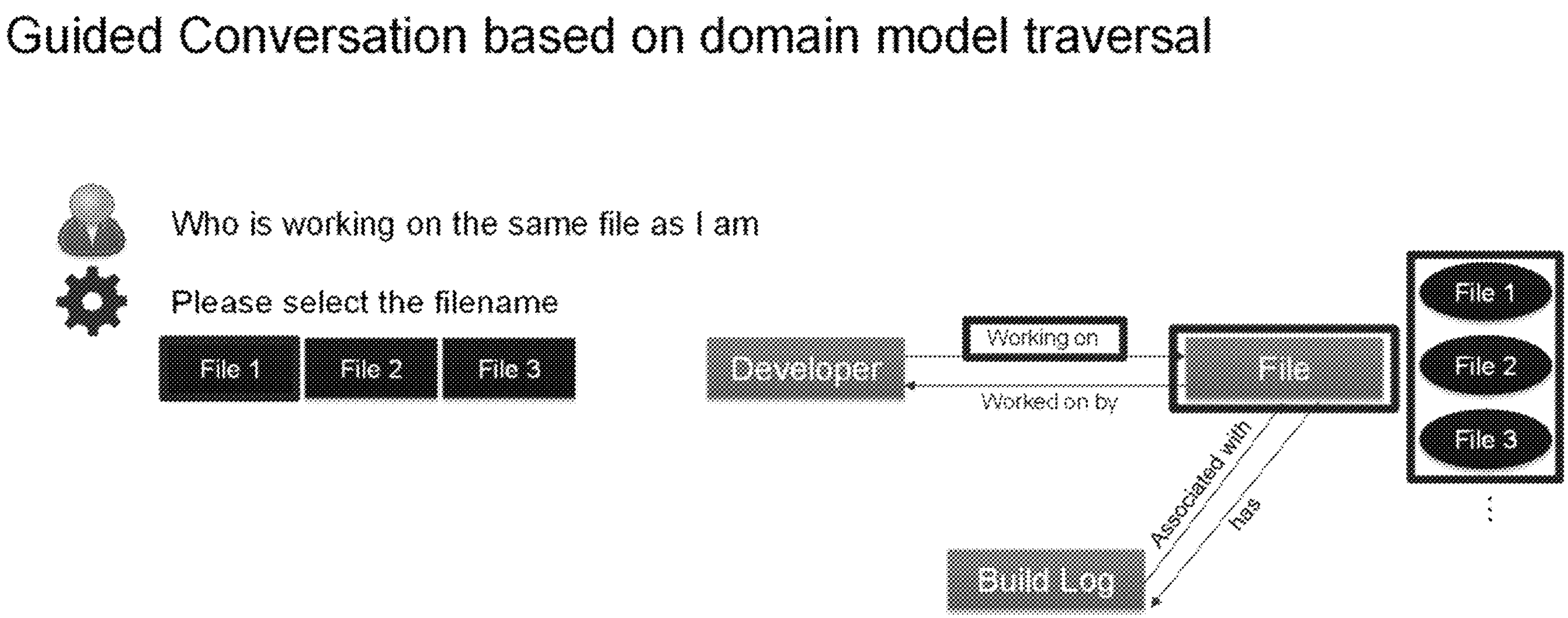
FIG. 5 illustrates a guided conversation based on domain model traversal for the software development environment of FIG. 3 for customized visualization based intelligence augmentation, according to an example of the present disclosure.

The iterative request refiner 102 may operate in conjunction with a set of domain specific repositories 108 to implement the guided conversation with the user associated with the user request 104 to generate the relevant refinement questions. The domain specific repositories 108 may include, for example, a lexicon repository 110, a refinement rules repository 112, and a knowledge model repository 114. The lexicon repository 110 may pertain to a vocabulary of a person, language, or branch of knowledge with respect to certain terms that are specific to a given domain, where the terms are identified by natural language processing. The refinement rules repository 112 may include a plurality of rules to guide the refinement of the user request 104. With respect to refinement rules, an example of a refinement rule may include a Rule #1 (e.g., as per 310 of FIG. 3—If Node==Build Log, Group→Log_Type. If Node represents entity Build Log, Group the instance values as per attribute Log_Type). This refinement rule may be used to refine an inquiry in an incoming user request to seek information based on Log_Type categorization, instead of actual instance values, which may grow exponentially over time. The refinement in this case is described in FIG. 6. Instead of refining the inquiry to "For which particular Build Log are you seeking the information for" and then displaying all possible build logs instances, the inquiry may be refined to "Are you looking for information based on log types", and only categories of build logs may be displayed to simplify comprehension and selection. According to another example of a refinement rule, Rule #2 (If Count_Instances(File)==1, Show information without Refinement. If instances of File entity at runtime equals to 1 (Only 1 file exists in domain model), then show the information directly, instead of refining the inquiry). In FIG. 5, the iterative request refiner 102 may not reply back with a query that asks "Please select filename", if only 1 file instance existed, and instead would move to a next step automatically (e.g., as described with reference to FIG. 6). The rules of the refinement rules repository 112 may be used to present supplemental questions to a user associated with the user request 104 to refine the user request 104. The knowledge model repository 114 may include a plurality of knowledge models with respect to various domains. A knowledge model of the knowledge model repository 114 may be described as a domain model for a particular domain comprising of entities and relationships between the entities as disclosed herein with respect to FIG. 3.

The iterative request refiner 102 may include a machine learning (ML) component to learn, over time, the extent to which a specific user prefers to refine a type of the user request 104. For example, with respect to the example of FIGS. 3-9, the user request 104 may be specified as "Who is working on the same file as I am". The user request 104 for a particular user, after refinement by the request refiner 102 to generate a refined user request 116, may be modified to be "Who is working on the same file, where file refers to a specific file, and where the file caused build failure." Alternatively, the user request 104 for a different user, after refinement by the request refiner 102 to generate the refined user request 116, may be modified to be "Who is working on the same file, where file refers to a specific file."

The application of natural language processing and machine learning as disclosed herein may also be used to modify an order of rules in the refinement rules repository 112. For example, the rules in the refinement rules repository 112 may be modified to ascertain different specified levels of refinement for different users. The application of natural language processing and machine learning as disclosed herein may also be used to generate new rules for the refinement rules repository 112. For example, with respect to the generation of new rules, natural language processing may be used to analyze user feedback. If the user feedback is relatively bad (e.g., 3 stars or less on a scale of 1-5 stars, where 5 stars represents excellent) then the user may be asked to select the reason/issue. If the issue pertains to a query refinement category, then the user may be prompted to select a reason from a drop down menu which is targeted towards steps used in query refinement. If the user selects the same reason multiple times, then machine learning may be applied to modify the corresponding refinement rule or create a new refinement rule. For example, with respect to the request "Who is working on the same file as I am", if a user keeps receiving a list of files to select from and repeatedly selects it as an issue, and selects the reason as "Grouping required", then machine learning may be used to automatically create the rule "If Node==File→ Group→ Package" automatically determining the best possible way to group files.

A request classifier 118 may apply natural language processing to classify the refined user request 116 into one of three intelligence augmentation categories that include awareness, alert, and advice. The classification may be heuristic based. Examples of awareness include a request for information on a past or present slice (i.e., a portion) of the state of a project. Examples of requests classified into awareness may include "Who is working on the same file as I am", "What is the status of last build that I triggered", etc. Examples of an alert pertain to a request which specifies some information to be provided when a condition based on a slice of the assumed state of the system becomes true in the future (e.g., the occurrence of a future event, a metric being reached, a condition being met, etc.). Examples of requests classified into alert may include "Please inform me when a build triggered by me fails", "Alert me when any developer in my team commits new code", etc. Examples of an advice pertain to a request for information (which may be a slice of the assumed state or a set of actions) related to an assumed and/or hypothetical state of a system, or for an action that may occur in future (i.e., related to a past or present state of the system). Examples of requests classified into advice may include "What trainings are recommended for me," "How do I reduce L1 agent effort in duplicate ticket resolution", etc.

Based on the classification by the request classifier 118, the request classifier 118 may invoke a relevant domain insight analyzer (i.e., an awareness analyzer 122, an alerting analyzer 124, or an advice analyzer 126). The awareness analyzer 122 may analyze the classified refined user request 116 to ascertain awareness values associated with the refined user request 116. In this regard, the awareness analyzer 122 may set up the domain/knowledge model to be used by the insight analyses (e.g., including training analysis, code violation analysis, and file ownership analysis as shown in FIG. 1) for extraction of the output 144. In the case of awareness, this domain/knowledge model may be set to data exhaust of all the tools used in the environment. The awareness analyzer 122 may analyze the environment associated with the classified refined user request 116, sensors in the environment, trends associated with classified refined user request 116, and provide answers in the form of awareness values associated with the refined user request 116. For the example of FIGS. 3-9 where the user request 104 may be specified as "Who is working on the same file as I am" and the refined user request 116 is modified to be "Who is working on the same file, where file refers to a specific file, and where the file caused build failure," the answers (e.g., output 144) in the form of awareness values may include other users who are working on a relevant file. In this regard, the request classifier 118 may operate in conjunction with an available insights repository 128 to ascertain the different types of insights that are available.

The alerting analyzer 124 may similarly analyze the classified refined user request 116 to ascertain alerting values associated with the refined user request 116, and output the alerting values as the output 144. In this regard, the alerting analyzer 124 may set up the domain/knowledge model to be used by the insight analyses (e.g., including training analysis, code violation analysis, and file ownership analysis as shown in FIG. 1) for extraction of the output 144. In the case of awareness, this knowledge model may be set to data exhaust of all the tools used in the environment (similar to the awareness analyzer 122). Secondly, the alerting analyzer 124 may set up hooks in the environment pertaining to the user request 104 to enable immediate information push to a user in case threshold values are exceeded, or a certain condition is met (depending upon the user request 104).

The advice analyzer 126 may similarly analyze the classified refined user request 116 to ascertain advice values associated with the refined user request 116, and output the advice values as the output 144. In this regard, the advice analyzer 126 may set up the domain/knowledge model to be used by the insight analyses (e.g., including training analysis, code violation analysis, and file ownership analysis as shown in FIG. 1) for extraction of the output 144. In the case of advice, this knowledge model may be set to data exhaust of all the tools used in the environment and extended to support external sources of known information. For example, with respect to the user request "What trainings are recommended for me", in this case trainings related information may be present on multiple available sources such as ACCENTURE LEARNING BOARDS, etc., and hence that information may be utilized in the extended knowledge model to support advice related requests.

With respect to the insight analyses (e.g., training analysis, code violation analysis, and file ownership analysis) at the bottom of FIG. 1, these engines may include of a set of BOTS that when called in correct order (e.g., a BOT CHAIN) retrieves the answer to the user request 104, as disclosed in further detail in Indian Application Serial No. 201641043670, entitled "INTENT AND BOT BASED QUERY GUIDANCE" (also filed as U.S. application Ser. No. 15/421,928 on Feb. 1, 2017). The insight analyses may pass the inquiry with the user request to these engines to retrieve the output 144.

With respect to the "enterprise data and software development data exhaust" that includes the "developer tools" and "references" as shown in FIG. 1, enterprise data and software development data exhaust may refer to a relatively large amount of environment data being generated by the tools used while engineering/maintaining a software application. The insight analyses may convert this heterogeneous data (different tools data is not meant to be used in conjunction with other tools—isolated use) into a coherent domain and knowledge model. This knowledge model may be used to refine/guide, classify a query included in the user request, and eventually to retrieve the answers to refined and classified queries.

A visualization analyzer 130 may utilize the output 144 from the awareness analyzer 122, the alerting analyzer 124, and the advice analyzer 126, which may be grouped in a domain specific environment and insights analyzer 132, to create the relevant results for a user request. In this regard, as disclosed herein with respect to FIG. 8, the visualization analyzer 130 may classify the request category and the type and size of the output 144 to a set of visualizations 134. With respect to classification, depending upon the type, structure, and size of the output 144, the machine learning engine of the visualization analyzer 130 may identify the most relevant visualization that may be used to depict the output data. There may be multiple visualizations for the same data. However, the visualization with the highest confidence score determined by the machine learning engine may be selected. In the case of "Who is working on the same file as I am", for the "Output 1" of FIG. 8 as discussed below, the output type may be identified as Array (JSON Array), and the output size may be four, leading to possible visualizations as list and grid. Since the size four may be relatively easy to accommodate in the available space, as per Rule #3 in the visualization repository, all the developers mentioned in the JSON may be represented in a single row, with a toggle option to change the layout to grid, if needed. Based on Rule #1 and Rule #2 in the embellishment repository, since the output data contains Slack ID as a field, the collaboration channel option and profile images may also be displayed for corresponding developers. Apart from this, feedback stars may be shown despite what the insight/visualization is, for example, to help the user to provide appropriate feedback, thereby facilitating learning by the machine learning engine to subsequently learn and tweak itself, and determine better visualizations in the future. In a similar manner, with respect to Output 2 of FIG. 9 as discussed below, similar to Output 1, a higher size of output data may lead to grid visualization, compared to list for FIG. 8. For example, a type of data for the output 144 may include time series data, which may represent a point value of a metric, a type of the data may represent a person's name, etc. As disclosed herein with respect to FIG. 8, the visualizations 134 may be governed by a set of visualization rules stored in a visualization rules repository 136.

Figure 8:
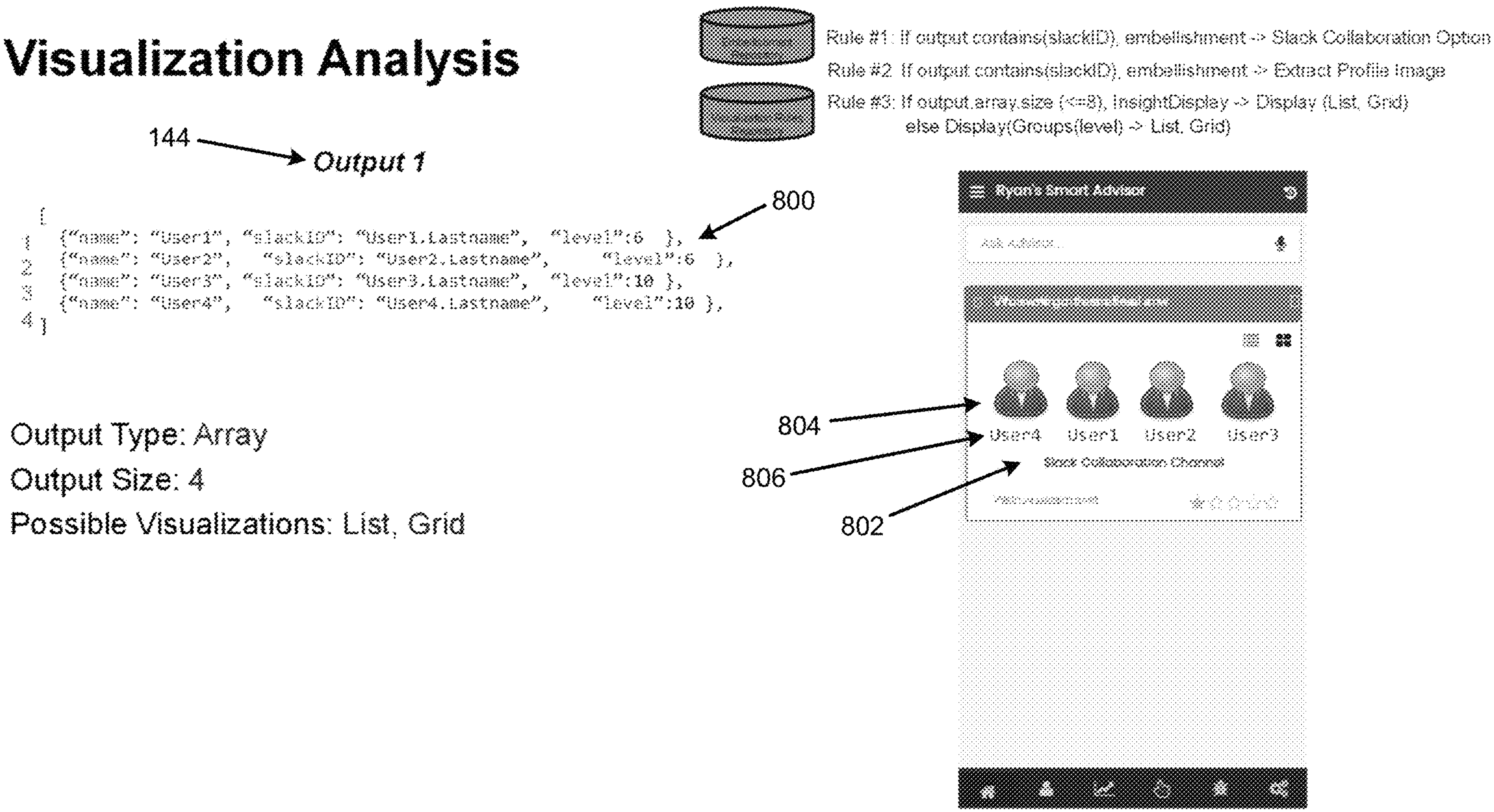
FIG. 8 illustrates visualization analysis for the software development environment of FIG. 3 for customized visualization based intelligence augmentation, according to an example of the present disclosure.

As disclosed herein with respect to FIG. 8, the insight analysis output 144 may be mapped to a request-specific mix of customized visualizations which are augmented with embellishments to assist a user. In this regard, based on the elements of the domain specific knowledge model present in the refined user request 116 and the insight analysis output 144, the visualization analyzer 130 may infer a set of embellishments which may be pertinent. For example, by using natural language processing by the request refiner 102 and mapping using the knowledge model repository 114, the visualization analyzer 130 may infer different types of embellishments. For example, if the refined user request 116 involves different users of the system 100, an embellishment may include providing links to one of the users' page, a link to the one of the users' photo, collaboration with the one of the users' through different types of media, etc. In this regard, the visualization analyzer 130 may operate in conjunction with an embellishment repository 120 to ascertain the different types of embellishments that may be inferred.

The visualization analyzer 130 may insert (available) additional information for embellishments into the visualizations 134. For example, an embellishment may include the inclusion of a photo and/or a link to a webpage of a particular individual associated with a visualization.

The visualization analyzer 130 may utilize machine learning to modify the visualization rules stored in the visualization rules repository 136, for example, by changing a visualization rule priority, adding and/or removing existing visualization rules, modifying content of a visualization rule, etc.

The visualization analyzer 130 may utilize a visualization widget repository 138 to obtain the visualizations that are to be embellished. For example, the visualization widget repository 138 may include a plurality of available visualizations that may be embellished by the visualization analyzer 130.

Figure 34:
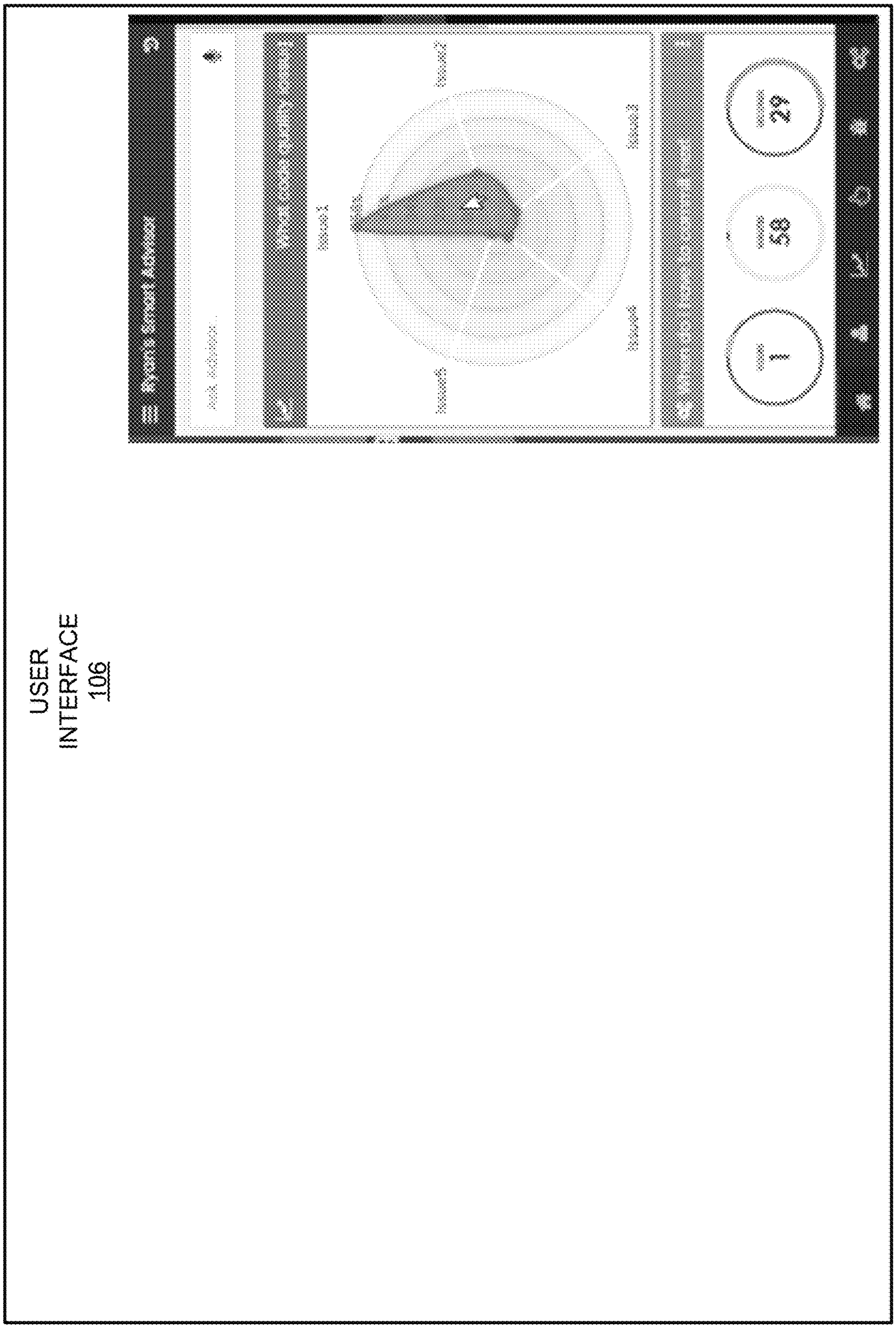
Figure 35:
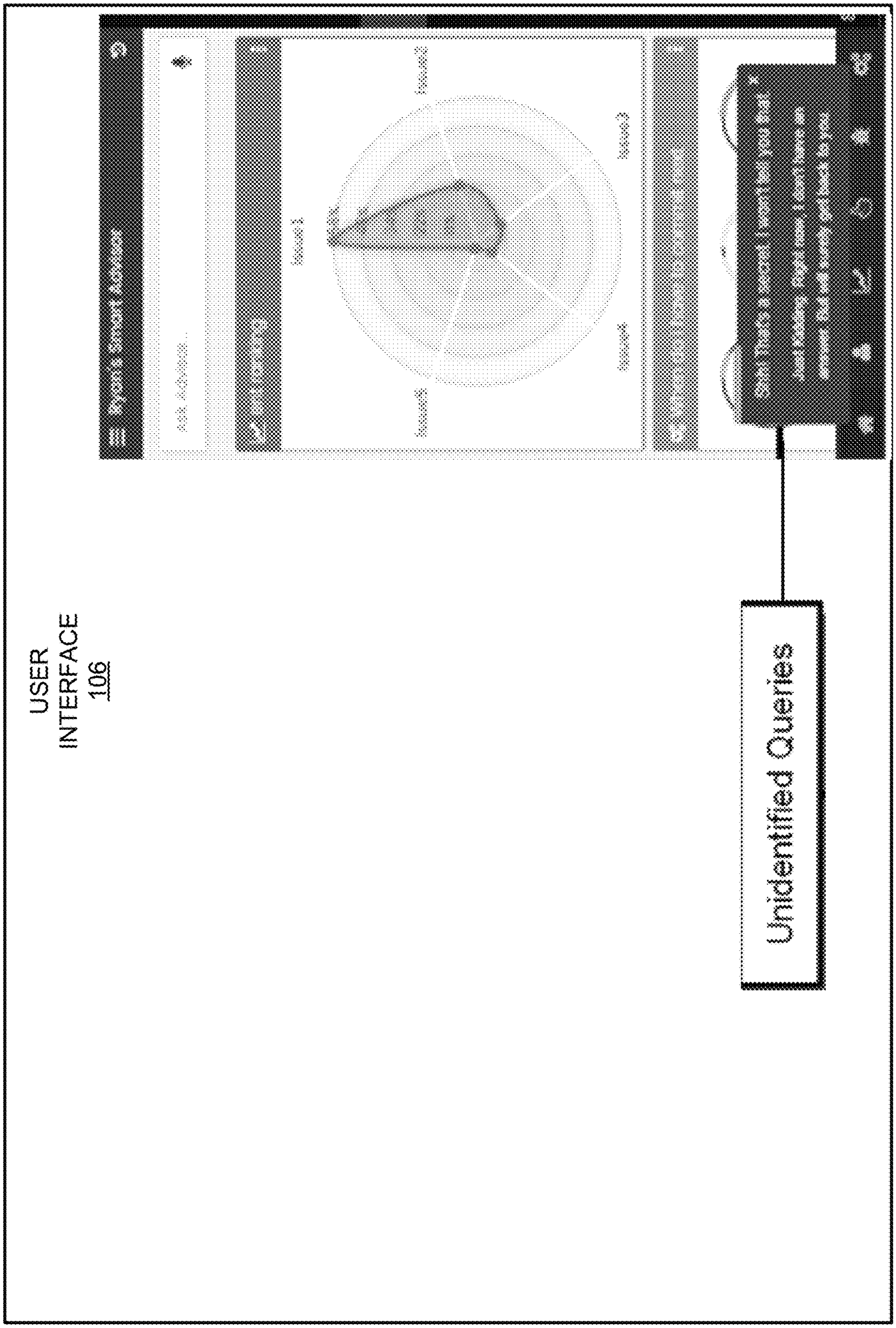
Figure 36:
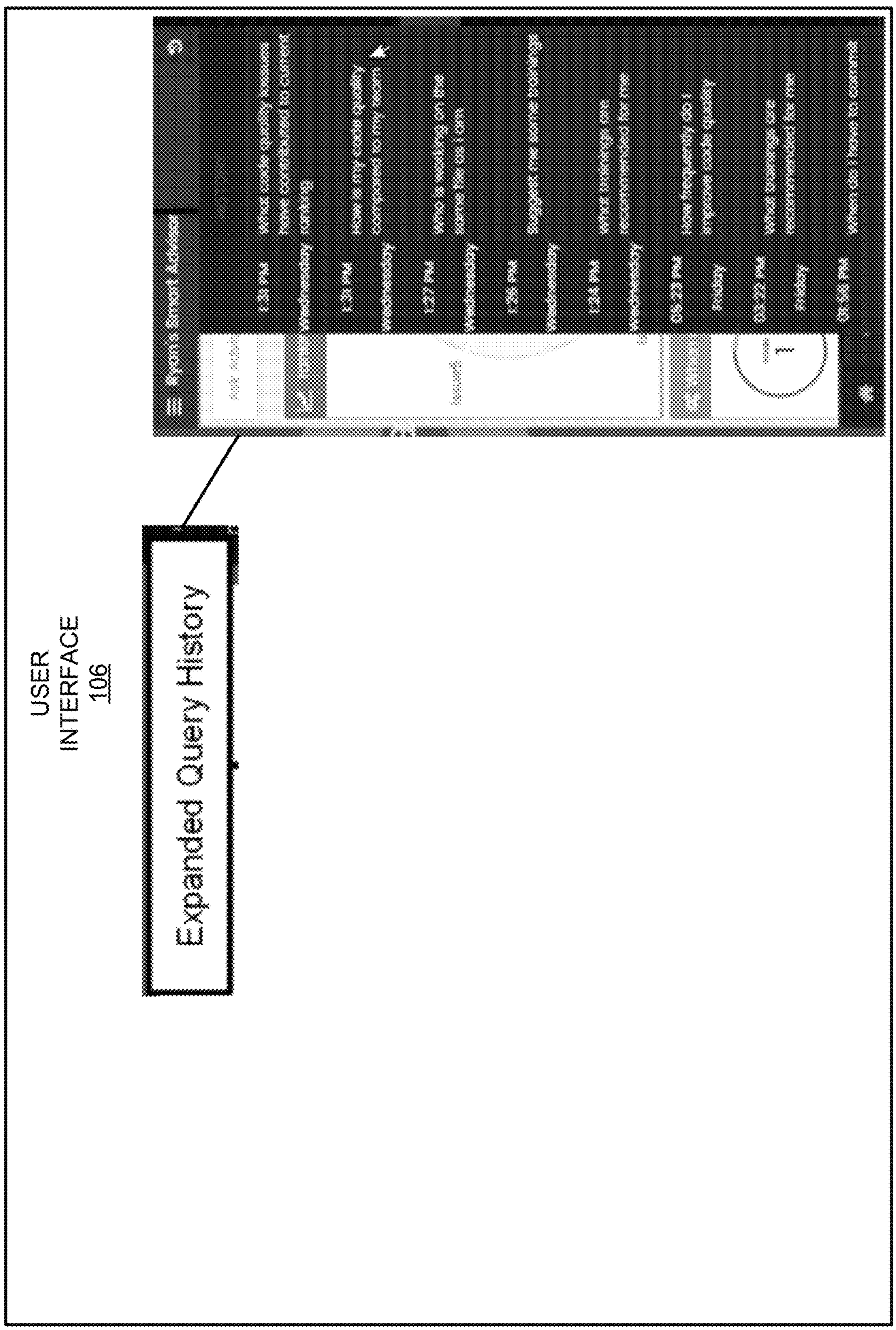
Figure 37:
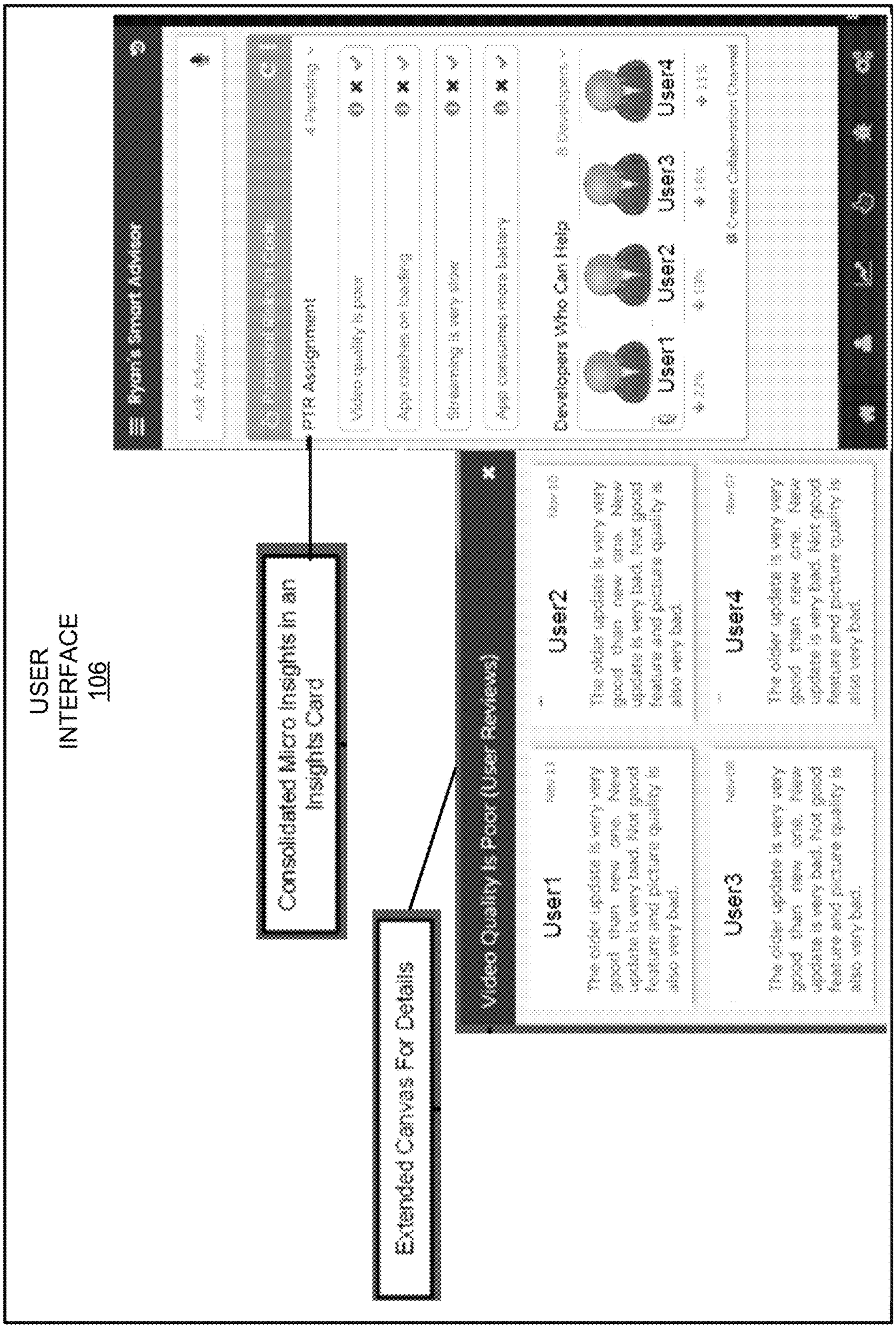

The embellished visualizations 134 may be rendered in a configurable and interactive user interface rendering 140 displayed on the user interface 106. The configurable and interactive user interface rendering 140 may provide for modification of the embellished visualizations 134. For example, the configurable and interactive user interface rendering 140 may provide for modification of filtering, persistence, positioning, and themes with respect to the embellished visualizations 134. With respect to filtering, as illustrated in FIG. 34, the bottom bar with a plurality (e.g., six) icons may represent the filter bar. Every insight displayed as a card may pertain to a particular category, depending upon the data that is being requested. After multiple queries, the screen display may become convoluted, and although scrolling is supported, it may become challenging to navigate to a previous queries result. Therefore, clicking on a particular filter may show insight cards pertaining to that category, while hiding all others. With respect to persistence, referring to FIG. 10, a user may choose to persist a particular insight permanently on the configurable and interactive user interface rendering 140. For example, "How many new quality issues did I inject in this case" may represent an insight in this case. All persisted insights may remain on the insights pane, even after restarting the system, whereas all non-persistent insights may be removed on restart. With respect to positioning, for each display of the configurable and interactive user interface rendering 140, content may be displayed on the bottom right corner of the configurable and interactive user interface rendering 140. However, for convenience purposes, the content may be dragged to any location on the configurable and interactive user interface rendering 140 as needed for the user. With respect to themes, themes may refer to the changing of the color scheme of the entire configurable and interactive user interface rendering 140, or insight card header as specified by a user.

At 142, feedback with respect to the embellished visualizations 134 may be analyzed by the iterative request refiner 102 for further refinement of a user request 104. With respect to further refinement and feedback analysis, assuming that the user continues to repeat the query "Who is working on the same file as I am" every single day, everytime the user has to choose "NO" as Log Type (as disclosed herein with respect to FIG. 6) to not refine the query as per Log Type, and the user provides a negative feedback score (as he/she is unhappy with the unwanted and unused guidance). This negative feedback score may be utilized by the machine learning engine of the iterative request refiner 102 to learn the user behavior/query pattern, and eventually not prompt Log Type based refinements in the future.

Figure 2:
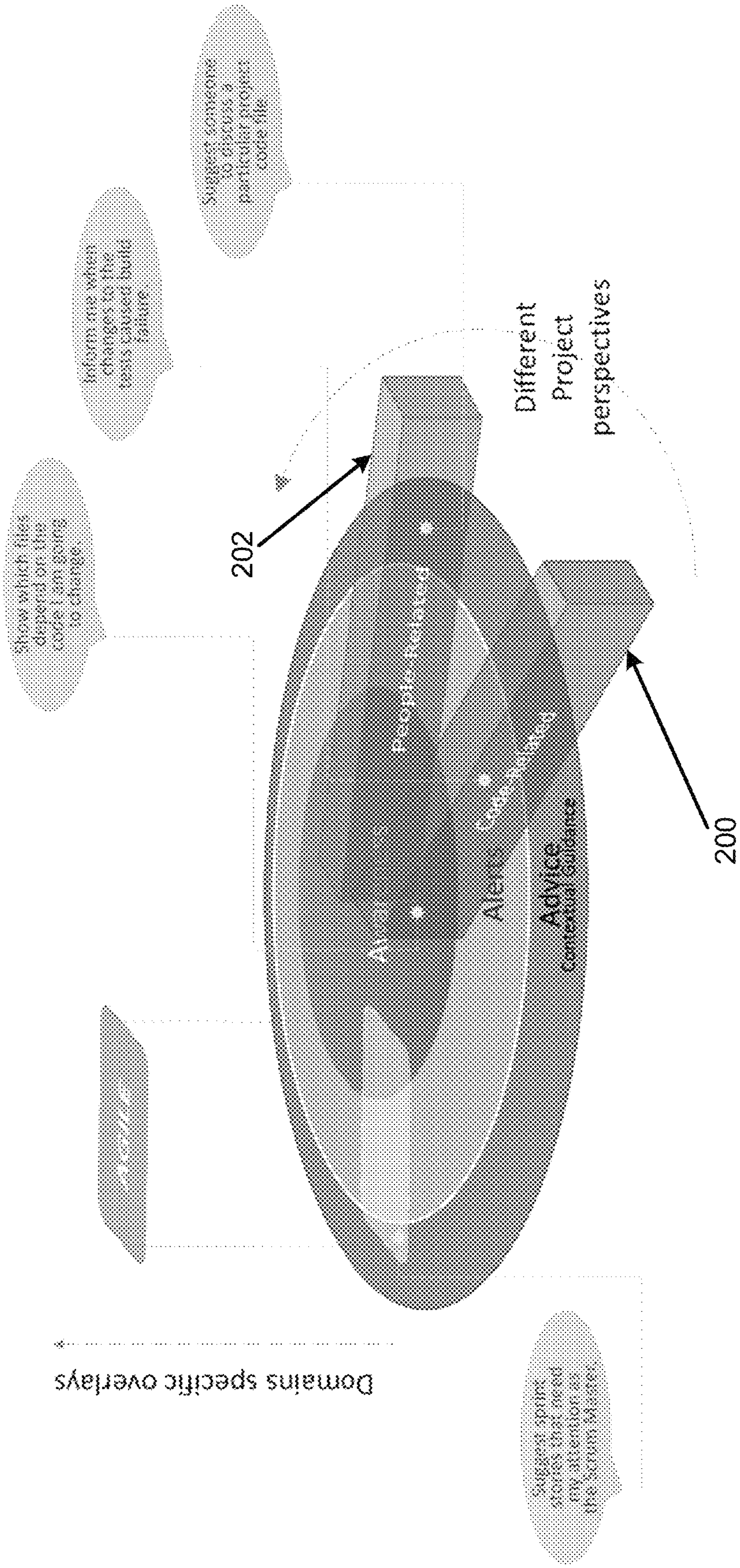
FIG. 2 illustrates different perspectives and domains with respect to intelligence augmentation in a software development environment for the customized visualization based intelligence augmentation system of FIG. 1, according to an example of the present disclosure.

FIG. 2 illustrates different perspectives and domains with respect to intelligence augmentation in a software development environment for the system 100, according to an example of the present disclosure.

Referring to FIG. 2, as disclosed herein, different types of user requests may be classified into the categories of awareness, alerts, or advice. Depending on domains and perspectives of particular projects, a particular request may be "code-related" or "people-related" as shown at 200 and 202, respectively. Request classification may be performed to categorize the requests as awareness, alert, and advise. Code-related 200 and people-related 202 overlays in FIG. 2 may be used to demonstrate the various project perspectives that can be addressed. For example, if the domain model includes people centric entity such as developers, any query that requests information about the developers (e.g., awareness, alert, or advise) may be informally referred to as people related insight.

Figure 3:
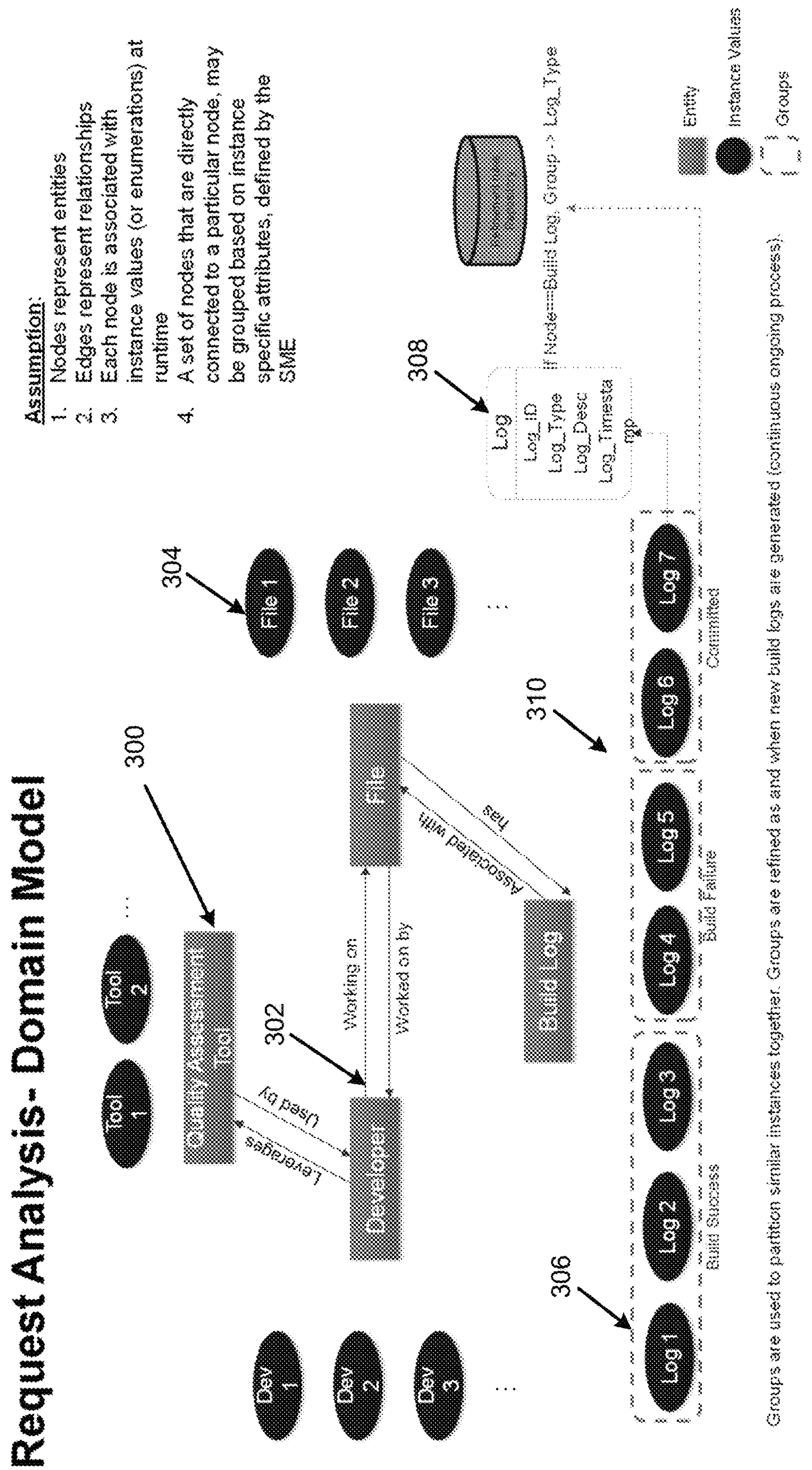
FIG. 3 illustrates a request analysis domain model for a software development environment for customized visualization based intelligence augmentation, according to an example of the present disclosure.

FIG. 3 illustrates a request analysis domain model for a software development environment for customized visualization based intelligence augmentation, according to an example of the present disclosure.

Referring to FIG. 3, the domain model may be based on the assumption that nodes at 300 represent entities, and edges at 302 represent relationships. Each node may be associated with instance values (or enumerations) at 304 at runtime. For example, the "file" node may be associated with "file 1", "file 2", and/or "file 3".

A set of nodes that are directly connected to a particular node may be grouped at 306 based on instance specific attributes which may be defined, for example, by a subject matter expert. For example, the "build success" group may be based on instance specific attributes "log 1", "log 2", and "log 3", the "build failure" group may be based on instance specific attributes "log 4" and "log 5", etc. The domain model (such as in FIG. 3) may include entities (represented by nodes, e.g., developer, file, etc.) and edges, representing relationships between the nodes. The edges may be assumed to be annotated with labels that describe the relationship (e.g., a "developer" entity "working on" a "file" entity, a "file entity" is "worked on by" a "developer" entity, etc.). There may be any number of instances associated with a particular entity at a particular point of time. For example, in FIG. 3, when the request analysis is performed, at the point of time of performance of the request analysis, the "developer" entity may include instances "dev1", "dev2", and "dev3", etc., the "file" entity may include instances "file 1", "file 2", and "file 3", etc. In FIG. 3, the instances have been shown along with the entity nodes in the domain model. However, these instance values may not be static, and may need to be retrieved when the request is analyzed. The instance values may vary from time to time, depending on the current runtime situation. All instances of a particular entity may share the same set of attributes. For example, in FIG. 3, the "build log" entity's instances ("log 1", . . . "log 7") share the attributes such as Log_ID, Log_Type, Log_Desc, and Log_Timestamp as shown at 308. There may be additional attributes compared to those shown in the example of FIG. 3. A subject matter expert rule may state that if node is of type "build log", then group its instances by the Log_Type. Hence, as shown at 310, the instances of the "build log" entity are shown to be grouped by the Log_Type as "build success" ("log 1", "log 2", "log 3" are assumed to have "build success") and so on for "Build Failure" and "Committed". In this regard, groups may be used to partition similar instances together. Further, groups may be refined as and when new build logs are generated (i.e., in a continuous ongoing process).

For the example of FIG. 3, a node to node relationship for the "developer" and "file" nodes may be interpreted, for example, as "a developer is working on a file" and "a file is worked on by a developer", etc.

Figure 4:
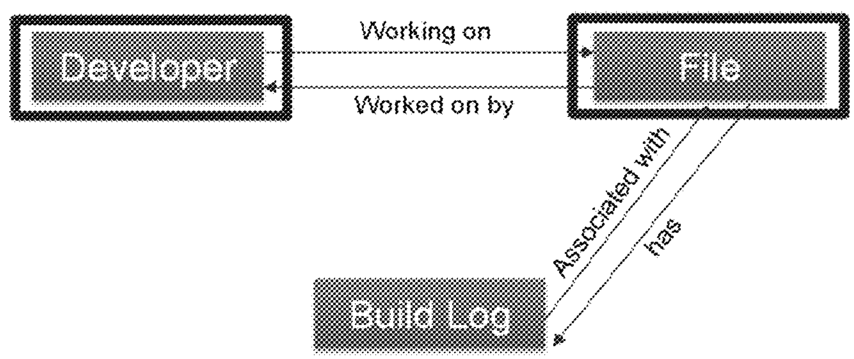
FIG. 4 illustrates retrieval of a starting point to traverse the domain model from a request for the software development environment of FIG. 3 for customized visualization based intelligence augmentation, according to an example of the present disclosure.

With respect to the software development environment of FIG. 3 and the associated example of FIGS. 4-9, the user request 104 may be specified, as shown in FIG. 4, as "Who is working on the same file as I am". The user request 104, after refinement by the request refiner 102, may be modified to be "Who is working on the same file, where file refers to a specific file, and where the file caused build failure."

FIG. 4 illustrates retrieval of a starting point to traverse the domain model from a request for the software development environment of FIG. 3 for customized visualization based intelligence augmentation, according to an example of the present disclosure.

Referring to FIGS. 1-4, and particularly FIG. 4, a developer (i.e., a user) may issue the user request 104 as "Who is working on the same file as I am". In this regard, the iterative request refiner 102 may intelligently match (e.g., by mapping) portions of a domain specific knowledge model to the user request "Who is working on the same file as I am", where the domain specific knowledge model represents the domain model of FIG. 3 for a particular domain comprising of the entities and relationships between the entities. The iterative request refiner 102 may retrieve starting nodes to traverse the domain model from the user request 104, where the starting nodes may be referred to as nodes of interest. For the example of FIGS. 3 and 4, nouns in the user request "Who is working on the same file as I am" include "who", "file" and "I", and thus the nodes of interest may be either "developer" or "file". Since the user request "Who is working on the same file as I am" includes the action "working on", the node of interest is accordingly determined to be "developer". Thus, traversal of the domain model of FIG. 3 may begin at the "developer" entity.

FIG. 5 illustrates a guided conversation based on domain model traversal for the software development environment of FIG. 3 for customized visualization based intelligence augmentation, according to an example of the present disclosure.

Referring to FIGS. 1-5, and particularly FIG. 5, based on traversal of the domain model of FIG. 3, since the "file" entity includes instance values "file 1", "file 2", and "file 3", the request refiner 102 may implement a guided conversation by generating relevant refinement questions by requesting selection of a particular filename from the available files "file 1", "file 2", and "file 3". In this regard, since the "file" entity may be associated with multiple files, the selection (e.g., the request to select) of a particular filename from the available files "file 1", "file 2", and "file 3" may represent a guided conversation implemented by the request refiner 102.

Further, as discussed above, the iterative request refiner 102 may extract other relevant dimensions. Other relevant dimensions may refer to traversing the domain model and extracting adjacent nodes (entities). Other relevant dimensions may also incorporate the retrieval of instance values of entities at runtime, that may vary with each iteration. For example, referring to FIG. 5, the relevant instances for the "file" entity are "file 1", "file 2", and "file 3" (that the current developer works on).

Figure 6:
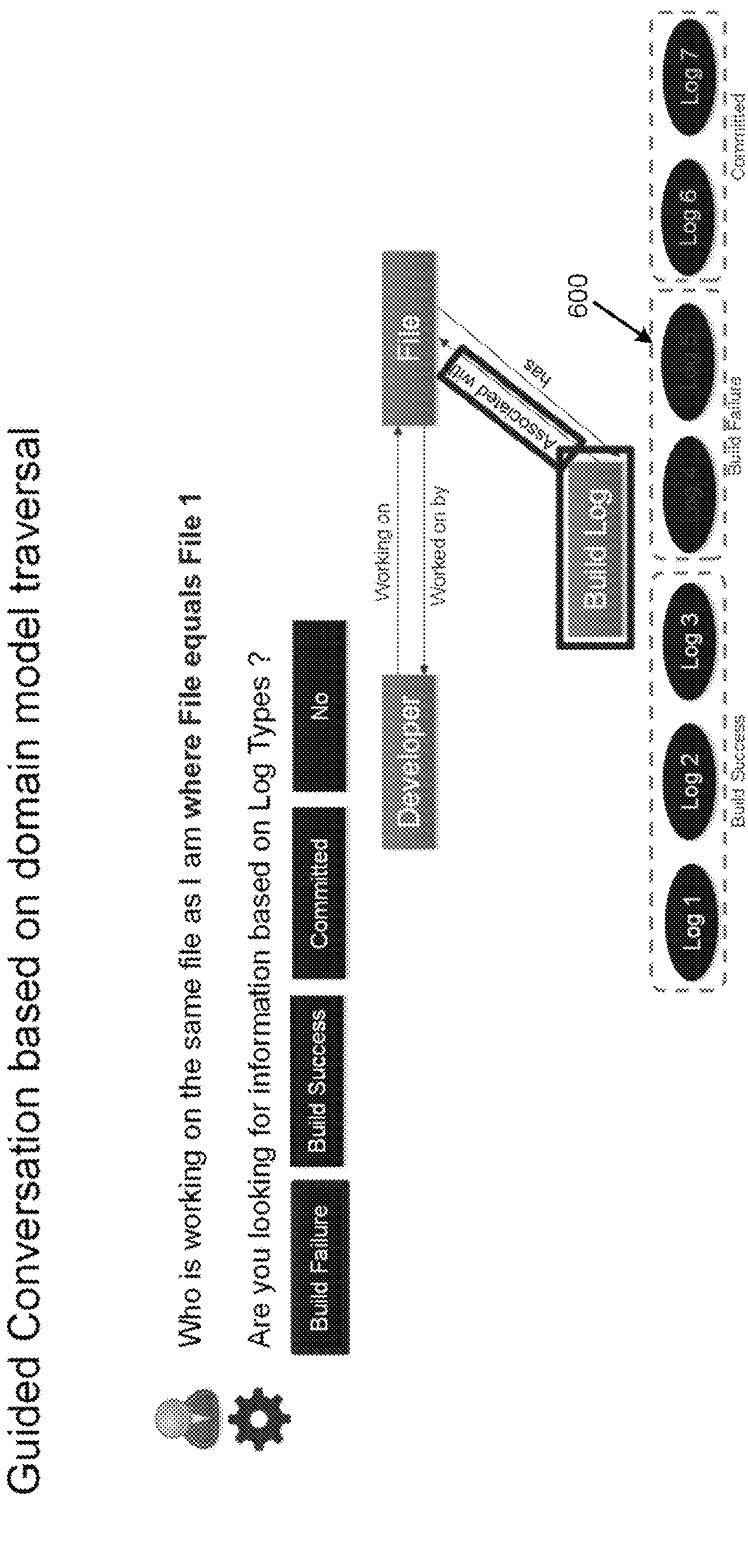
FIG. 6 illustrates further details of the guided conversation of FIG. 5 based on domain model traversal for the software development environment of FIG. 3 for customized visualization based intelligence augmentation, according to an example of the present disclosure.

FIG. 6 illustrates further details of the guided conversation of FIG. 5 based on domain model traversal for the software development environment of FIG. 3 for customized visualization based intelligence augmentation, according to an example of the present disclosure.

Referring to FIGS. 1-6, and particularly FIG. 6, based on the received user input with respect to selection of a particular filename from the available files "file 1", "file 2", and "file 3", the user request 104 may be refined to indicate "Who is working on the same file as I am where File equals File 1". In this regard, with respect to further refinement of the user request 104, since the "file" entity is further associated with "build log", the request refiner 102 may generate the inquiry "Are you looking for information based on Log Types?". Assuming that the user selects "build failure" as the information based on log types, the group 600 associated with "build failure" and including "log 4" and "log 5" may be selected.

Figure 7:
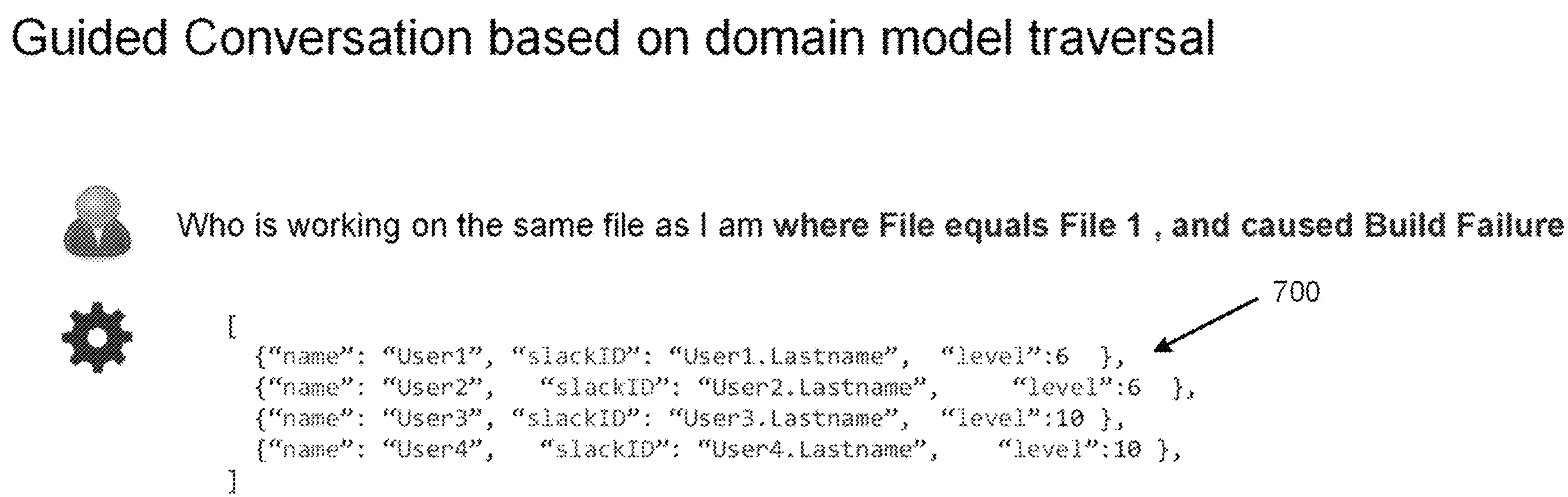
FIG. 7 illustrates further details of the guided conversation of FIG. 5 based on domain model traversal for the software development environment of FIG. 3 for customized visualization based intelligence augmentation, according to an example of the present disclosure.

FIG. 7 illustrates further details of the guided conversation of FIG. 5 based on domain model traversal for the software development environment of FIG. 3 for customized visualization based intelligence augmentation, according to an example of the present disclosure.

Referring to FIGS. 1-7, and particularly FIG. 7, based on the received user input with respect to selection of a particular log type (e.g., "build failure" from the available log types, the user request 104 may be refined to indicate "Who is working on the same file as I am where File equals File 1, and caused Build Failure", which represents the refined user request 116.

The request classifier 118 may use natural language processing to classify the refined user request 116 into one of the three intelligence augmentation categories that include awareness, alert, and advice. As disclosed herein, examples of awareness include a request for information on a past or present slice of the state of a project. Examples of an alert pertain to a request which specifies some information to be provided when a condition based on a slice of the assumed state of the system becomes true in the future (e.g., the occurrence of a future event, a metric being reached, a condition being met, etc.). Examples of an advice pertain to a request for information (which may be a slice of the assumed state or a set of actions) related to an assumed and/or hypothetical state of the system, or for an action that may occur in future (i.e., related to a past or present state of the system). With respect to classification of the refined user request 116 into one of the three intelligence augmentation categories that include awareness, alert, and advice, the request classifier 118 may implement machine learning to perform the request classification into one of the three afore-mentioned categories. The machine learning may include supervised learning that has been trained by multiple request statements (e.g., in English), which may be tagged to corresponding categories. In the case of lower confidence scores by the classifier (e.g., <0.7), a keyword search approach may be implemented for classification. For example, words like "alert", "inform", "notify", etc., may be used to identify the request under the alert category.

Based on the classification, the request classifier 118 may invoke a relevant domain insight analyzer (i.e., the awareness analyzer 122, the alerting analyzer 124, or the advice analyzer 126). The awareness analyzer 122 may analyze the classified refined user request 116 to ascertain awareness values associated with the refined user request 116. In this regard, the awareness analyzer 122 may analyze the environment associated with the classified refined user request 116, sensors in the environment, trends associated with classified refined user request 116, and provide the output 144 (e.g., the output 700 as shown in FIG. 7) in the form of awareness values associated with the refined user request 116. With respect to the output 700, JSON represented in FIG. 7 may be generated by the domain specific environment and insight analyzer 132, as disclosed in further detail in Indian Application Serial No. 201641043670, entitled "INTENT AND BOT BASED QUERY GUIDANCE" (also filed as U.S. application Ser. No. 15/421,928 on Feb. 1, 2017). Other users and other fields in the response JSON is an assumed response/output 144 by the domain specific environment and insight analyzer 132 in response to the incoming request "Who is working on the same file, where file equals File1, and caused build failure". For the example of FIGS. 3-9 where the user request 104 may be specified as "Who is working on the same file as I am" and the refined user request 116 is modified to be "Who is working on the same file, where file refers to a specific file, and where the file caused build failure," the output 144 in the form of awareness values may include other users who are working on a relevant file. With respect to the other users shown at 700 in FIG. 7, the JSON represented in FIG. 7 may be generated by the domain specific environment and insight analyzer 132, as disclosed in further detail in Indian Application Serial No. 201641043670, entitled "INTENT AND BOT BASED QUERY GUIDANCE" (also filed as U.S. application Ser. No. 15/421,928 on Feb. 1, 2017). Other users and other fields in the response JSON may represent an assumed response/output 144 by the domain specific environment and insight analyzer 132 in response to incoming user request "Who is working on the same file, where file equals File1, and caused build failure". In this regard, the request classifier 118 may operate in conjunction with the available insights repository 128 to ascertain the different types of insights that are available.

The alerting analyzer 124 may similarly analyze the classified refined user request 116 to ascertain alerting values associated with the refined user request 116, and output the alerting values as the output 144. The advice analyzer 126 may similarly analyze the classified refined user request 116 to ascertain advice values associated with the refined user request 116, and output the advice values as the output 144.

FIG. 8 illustrates visualization analysis for the software development environment of FIG. 3 for customized visualization based intelligence augmentation, according to an example of the present disclosure.

Referring to FIGS. 1-8, and particularly FIG. 8, the visualization analyzer 130 may utilize the output 144 from the awareness analyzer 122, the alerting analyzer 124, and the advice analyzer 126, which may be grouped as the domain specific environment and insights analyzer 132, to create the relevant results for the user request 104. In this regard, the visualization analyzer 130 may classify the request category and the insight output type and size to a set of visualizations 134. The visualizations 134 may be governed by a set of visualization rules stored in the visualization rules repository 136. The visualization analyzer 130 may utilize the visualization widget repository 138 to obtain the visualizations that are to be embellished.

For example, the relevant set of visualization rules stored in the visualization rules repository 136 may include "Rule #1: If output.contains(slackID), embellishment→Slack Collaboration Option", "Rule #2: If output.contains(slackID), embellishment→Extract Profile Image", and "Rule #3: If output.array.size (<=8), InsightDisplay→Display (List, Grid); else Display(Groups(level)→List, Grid)".

Based on the elements of the domain's knowledge model present in the request, the visualization analyzer 130 may infer a set of embellishments. According to an example, using natural language processing by the request refiner 102 and mapping using the knowledge model repository 114, the visualization analyzer 130 may infer different types of embellishments. The embellishments may also be inferred from the data of the output 144, and pre-defined rules specified in the visualization rules repository 136, and the embellishment repository 120. For example, if the refined user request 116 involves different users of the system 100 (e.g., the users "user1", "user2", "user3", "user4", etc., as shown at 700), an embellishment may include providing links to one of the users' page, a link to the one of the users' photo, collaboration with the one of the users' through different types of media (e.g., via a slack identification (ID)), etc. In this example, the slack ID refers to a user's unique identification on Slack, which may represent a third-party team collaboration platform. However, the embellishment may represent any unique attribute value in the result set/output. For example, a subject matter expert may have defined rules for embellishment (e.g., as in FIG. 8), such as if the output 144 includes a value for "slack ID", then the embellishment may include the slack collaboration option. In this regard, the visualization analyzer 130 may operate in conjunction with the embellishment repository 120 to ascertain the different types of embellishments that may be inferred.

As shown in FIG. 8, an output type for "Output 1" may include array, an output size of the array may be four as shown at 800, and possible visualizations may include a list or a grid. The "Output 1" may represent an example of a result set, that is produced by the awareness analyzer 122, the alerting analyzer 124, and/or the advice analyzer 126. With respect to determination of the "Output 1", when the iteratively refined (e.g., by the iterative request refiner 102) and classified user request 104 (e.g., by the request classifier 118) is sent to domain specific environment and insight analyzer 132, the domain specific environment and insight analyzer 132 may identify and execute a sequence of bot chain to retrieve the answer to the input query, as disclosed in further detail in Indian Application Serial No. 201641043670, entitled "INTENT AND BOT BASED QUERY GUIDANCE" (also filed as U.S. application Ser. No. 15/421,928 on Feb. 1, 2017). Per the Rule #1, since the output includes "slackID", the embellishment is determined to include a "slack collaboration option" in the visualization, with a "slack collaboration channel" being shown at 802. Per Rule #2, since the output includes "slackID", the embellishment is determined to include an "exact profile image" for each of the users listed in the "Output 1" as shown at 804 in the visualization. Further, per Rule #3, since the output array size is 4 (i.e., <=8), the insight display is determined to be a display including a list and a grid, with the users 1-4 being listed side-by-side as shown at 806.

Figure 9:
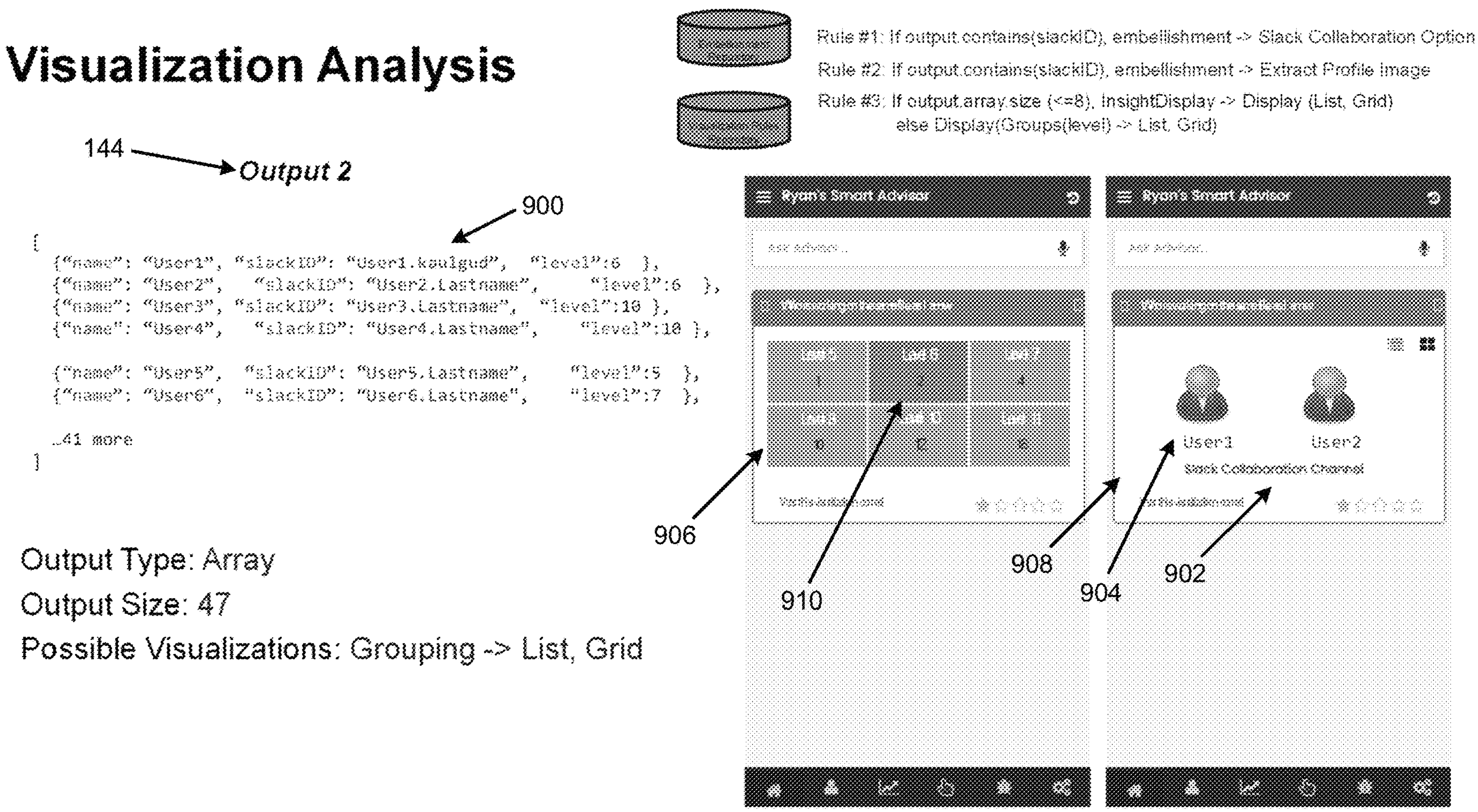
FIG. 9 illustrates further details of visualization analysis for the software development environment of FIG. 3 for customized visualization based intelligence augmentation, according to an example of the present disclosure.

FIG. 9 illustrates further details of visualization analysis for the software development environment of FIG. 3 for customized visualization based intelligence augmentation, according to an example of the present disclosure.

Referring to FIGS. 1-9, and particularly FIG. 9, an output type for "Output 2" may include array, an output size of the array may be forty-seven as shown at 900, and possible visualizations may include list and grid. Compared to "Output 1" which refers to a scenario where the size of the output set is relatively small (e.g., 4), "Output 2" refers to another scenario where the size of output set is relatively large (e.g., 47). With respect to the determination of "Output 2", when the iteratively refined (e.g., by the iterative request refiner 102) and classified user request 104 (e.g., by the request classifier 118) is sent to domain specific environment and insight analyzer 132, the domain specific environment and insight analyzer 132 may identify and execute a sequence of bot chain to retrieve the answer to the input query, as disclosed in further detail in Indian Application Serial No. 201641043670, entitled "INTENT AND BOT BASED QUERY GUIDANCE" (also filed as U.S. application Ser. No. 15/421,928 on Feb. 1, 2017). In this regard, the system 100 may include intelligence, by virtue of the subject matter rules specified, in determining the appropriate visualization of data depending on the output size. For example, per the Rule #1, since the output includes "slackID", the embellishment is determined to include a "slack collaboration option" in the visualization, with a "slack collaboration channel" being shown at 902. Per Rule #2, since the output includes "slackID", the embellishment is determined to include an "exact profile image" for each of the users listed in the "Output 2" as shown at 904 in the visualization. Further, per Rule #3, since the output array size is 47 (i.e., >8), the insight display is determined to be a display including a grouping per levels as shown at 906, and then a display of a list and a grid as shown at 908. In this regard, as shown at 910, assuming that "Level 6" users are selected at 910, the associated users (e.g., "user1" and "user2") are shown at 908. In this regard, the "levels" may represent a level of expertise associated with a user on a scale from 1-10, where "level1" represents a lowest level, and "level10" represents a highest level. The visualizations of FIG. 9 may also be referred to insight cards as disclosed herein.

FIGS. 10-37 illustrate various details of operation of the system 100, according to an example of the present disclosure.

Figure 10:
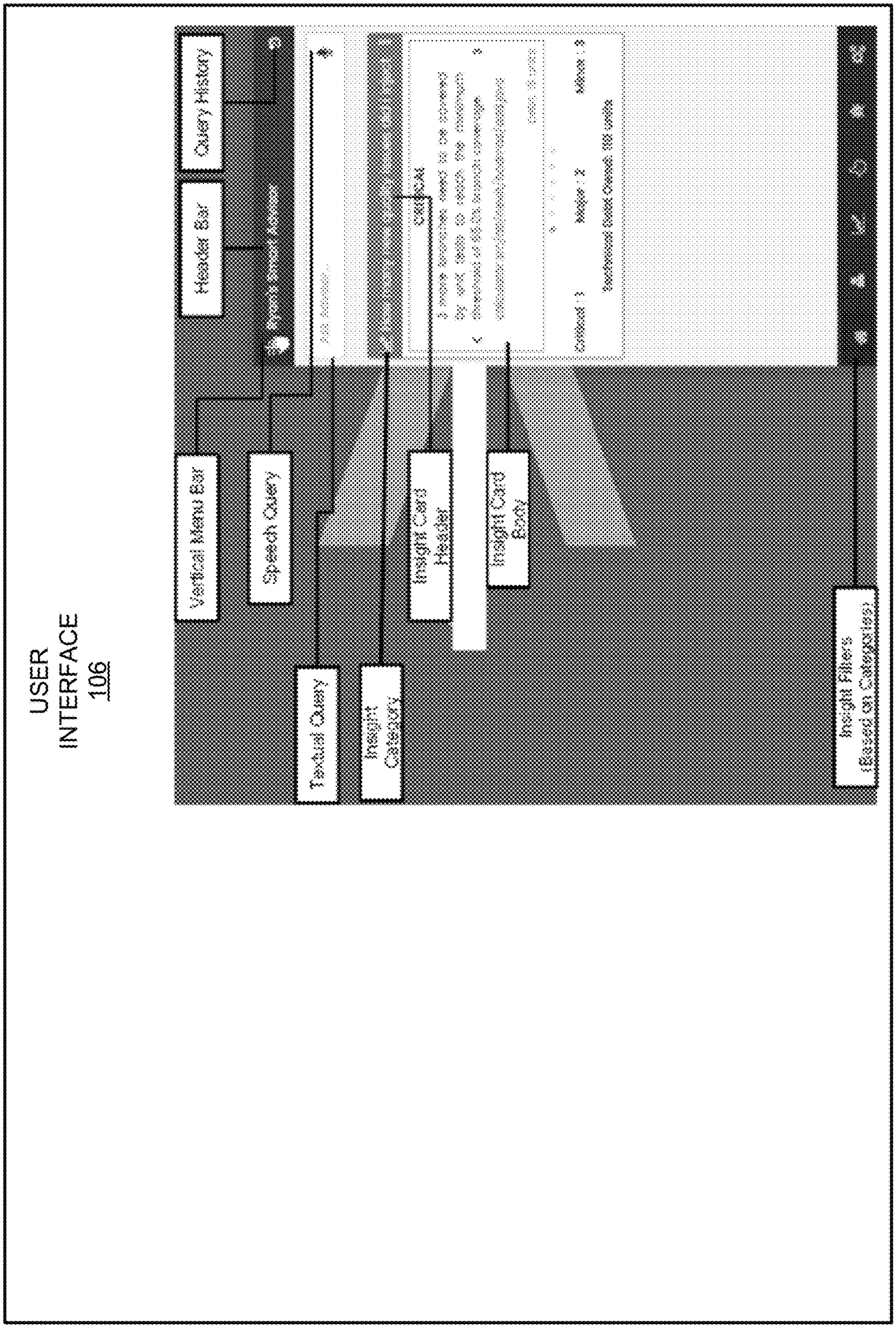
FIGS. 10-37 illustrate various details of operation of the customized visualization based intelligence augmentation system of FIG. 1, according to an example of the present disclosure.

In FIGS. 10-37, the various different alerts include "Alert me when do I have to commit next" (see FIG. 14), advise includes "What trainings are recommended for me" (see FIG. 22), and awareness displays include "Who is working on the same file as I am", "What code quality violations did I inject in the code", and "How is my code quality compared to my team" (see FIG. 10).

Figure 11:
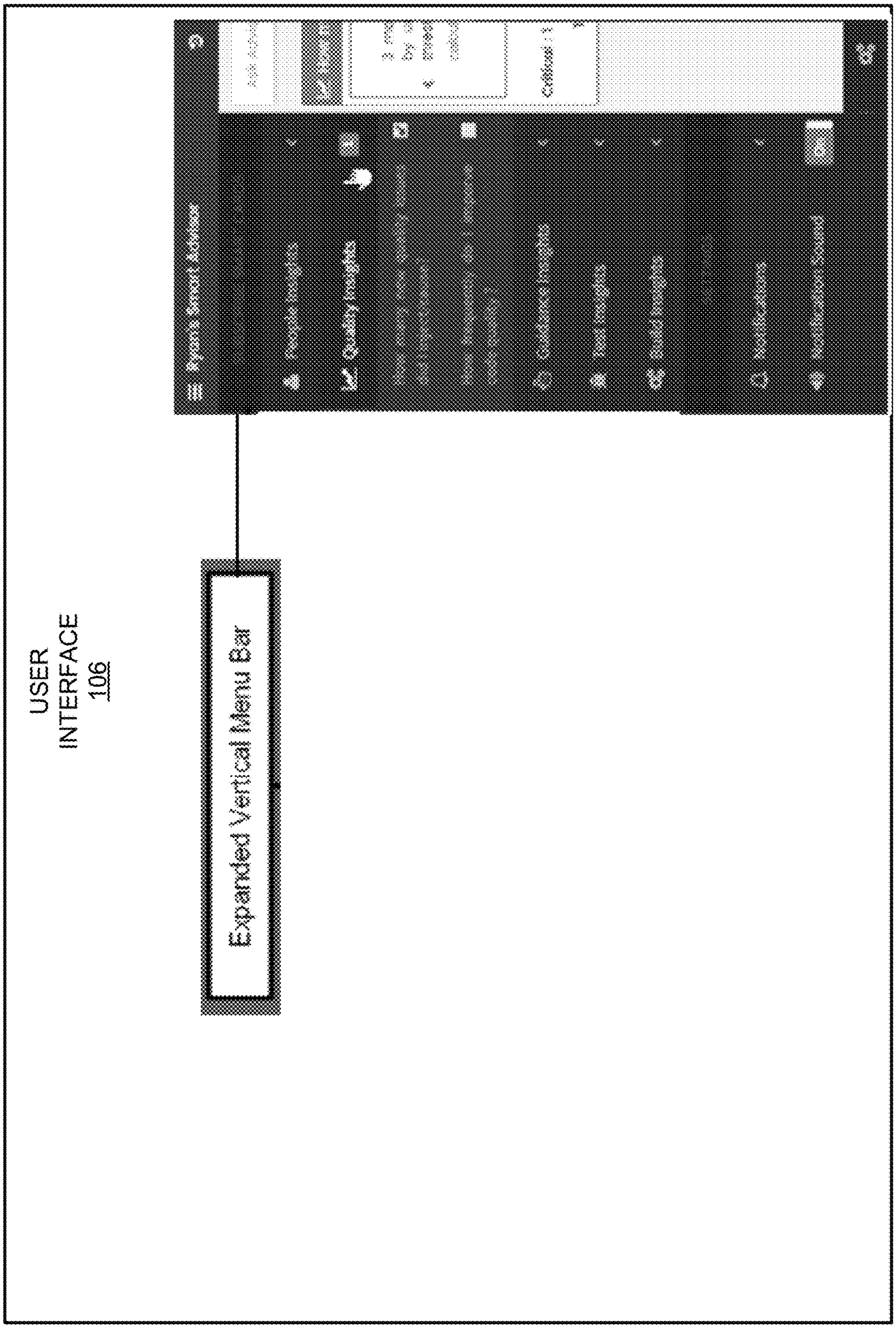
Figure 12:
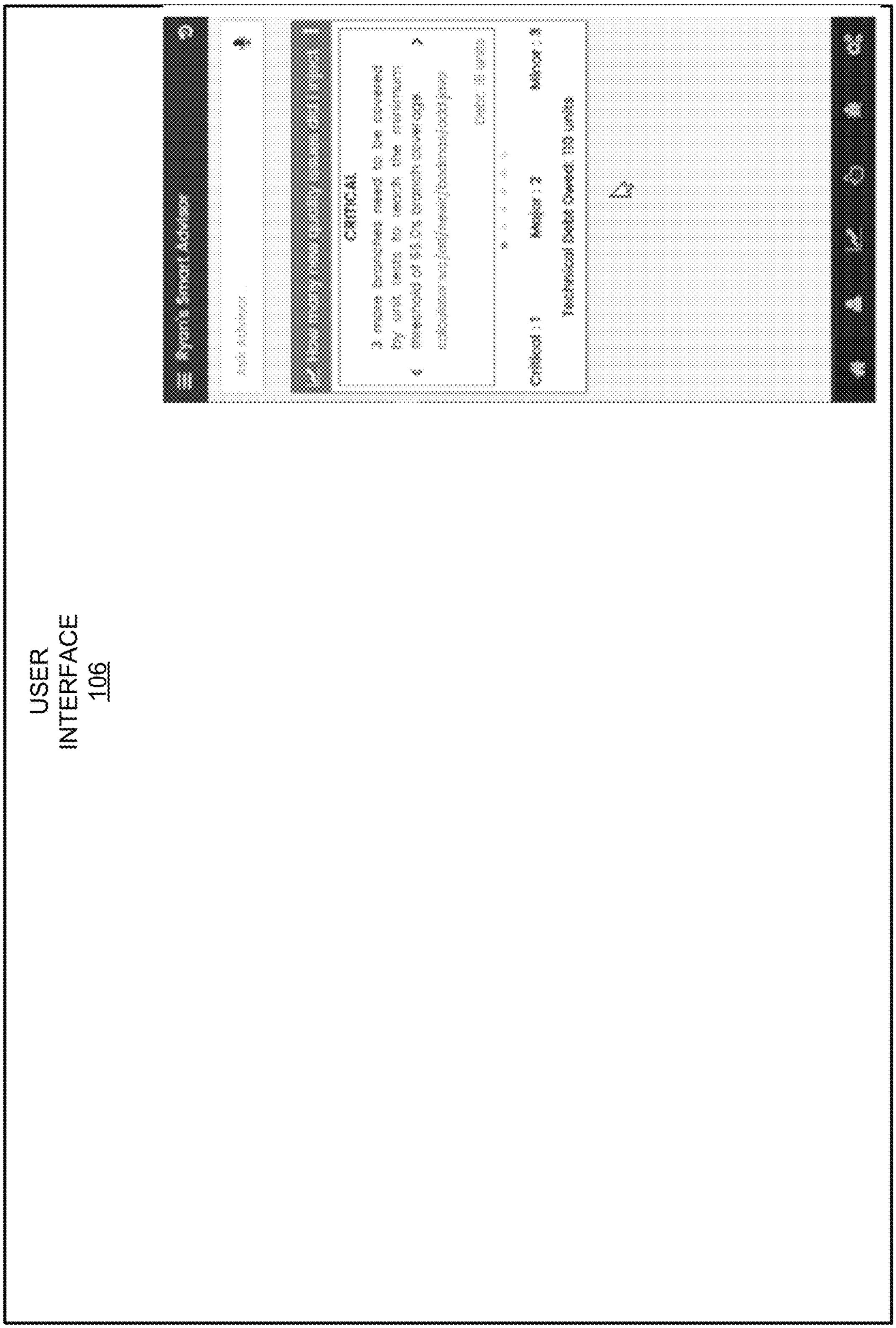

FIGS. 10-12 illustrate generation of an alert associated with a user request 104 specified as "How many new quality issues did I inject". In FIG. 10, with respect to the aspect of past and present states, a present state may be represented as a number and type of code quality violations caused by the most recent code commit.

FIG. 11 illustrates an expanded vertical menu with respect to the apparatus 100.

FIG. 12 illustrates a user request "How many new quality issues did I inject".

Figure 13:
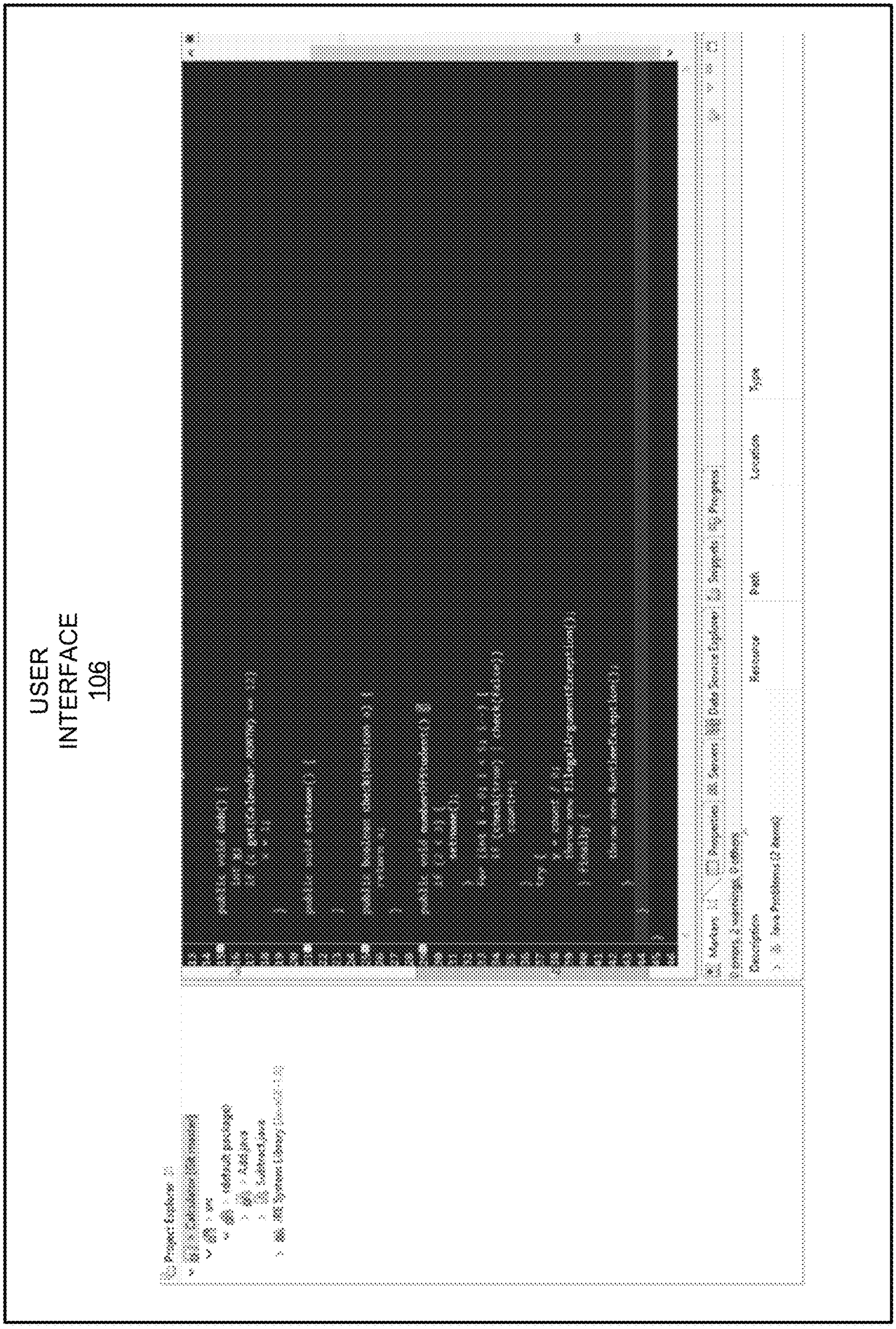

FIG. 13 illustrates processing of the user request 104 specified as "How many new quality issues did I inject" by the request refiner 102.

Figure 14:
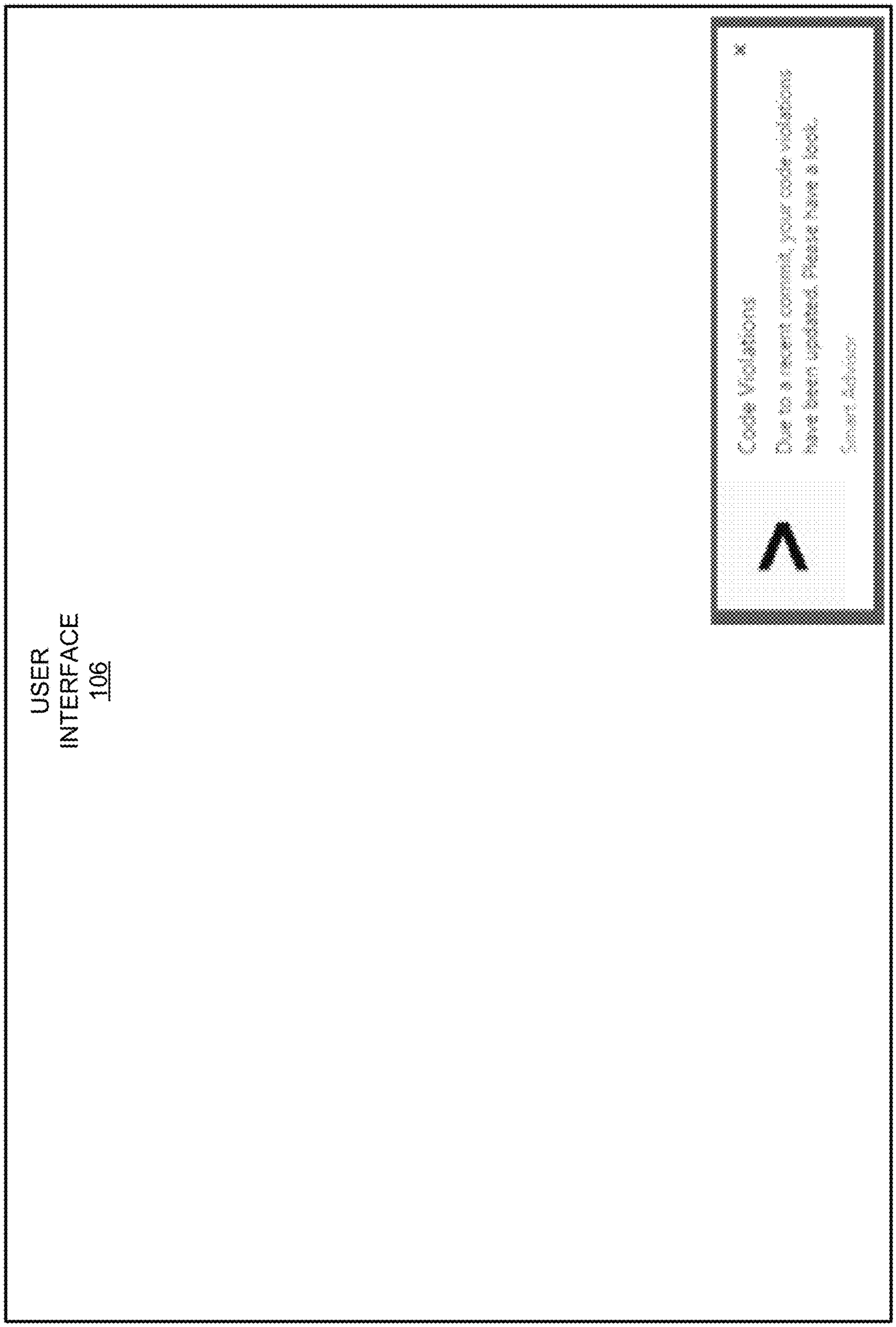
Figure 15:
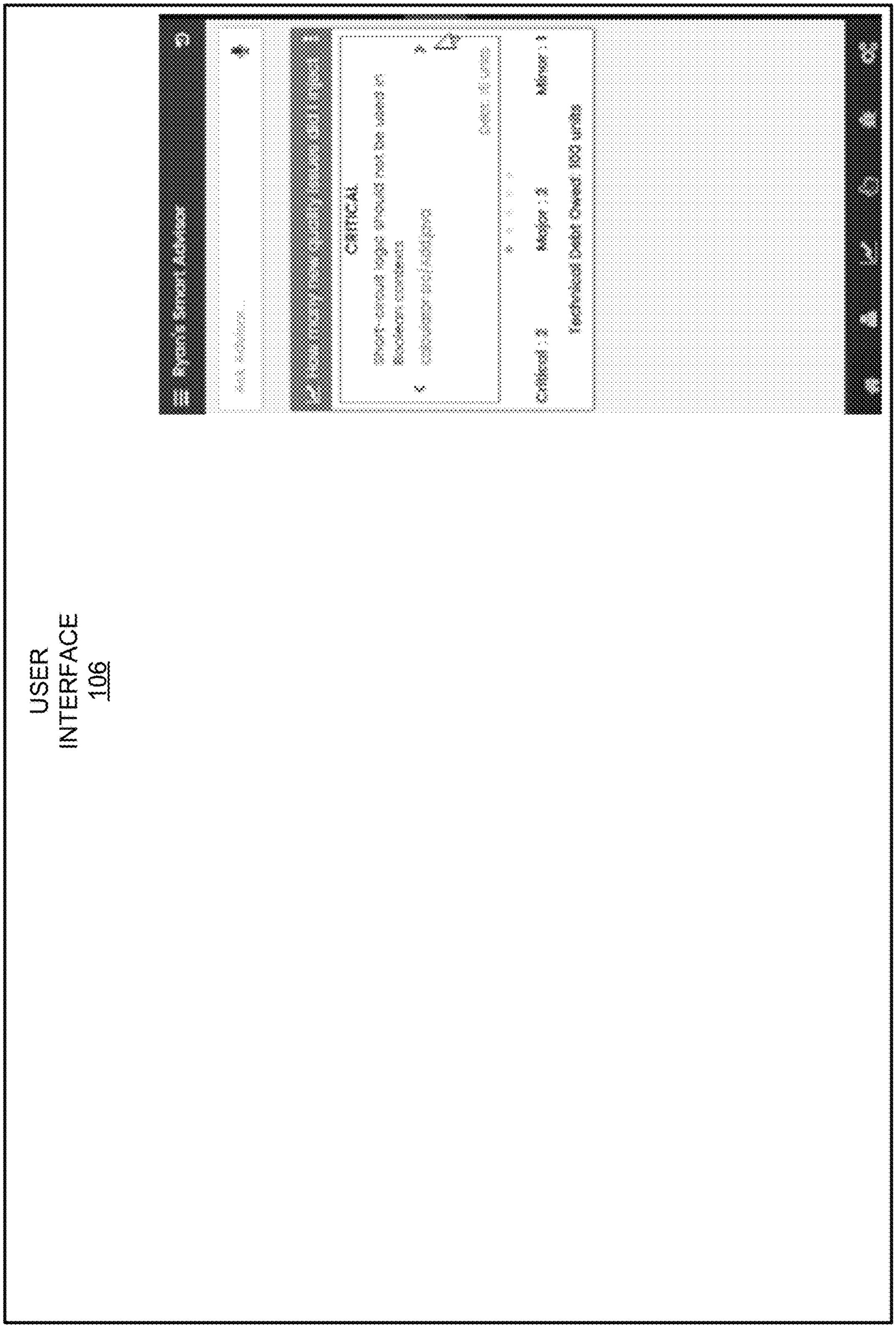
Figure 16:
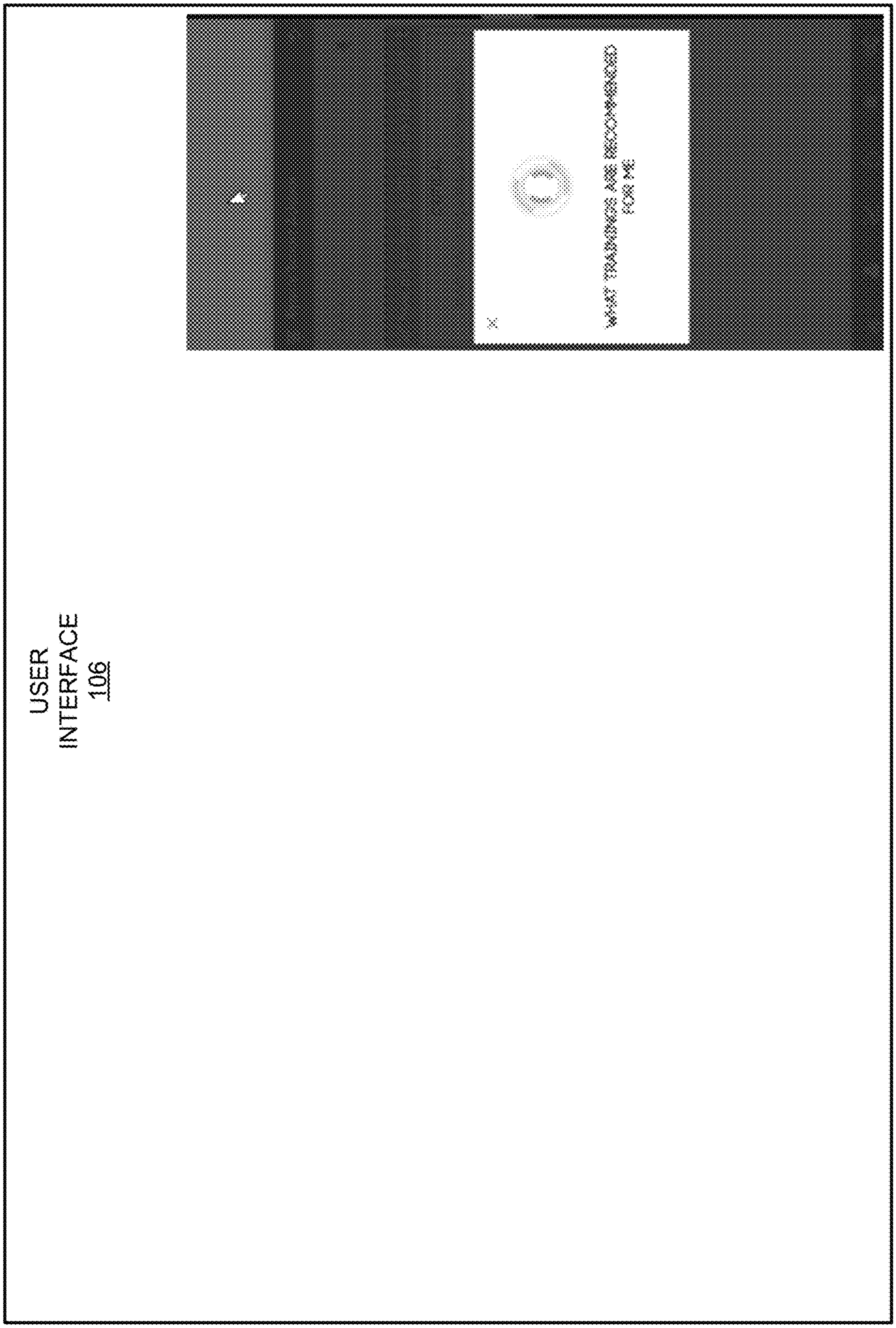
Figure 17:
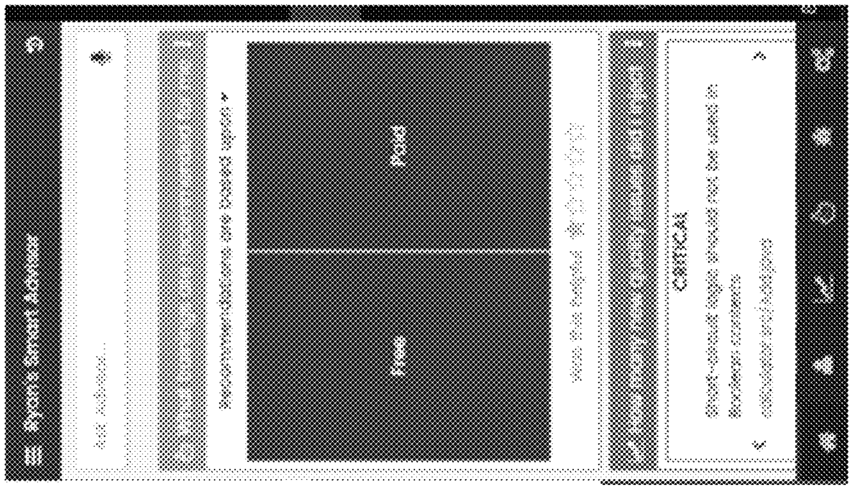
Figure 18:
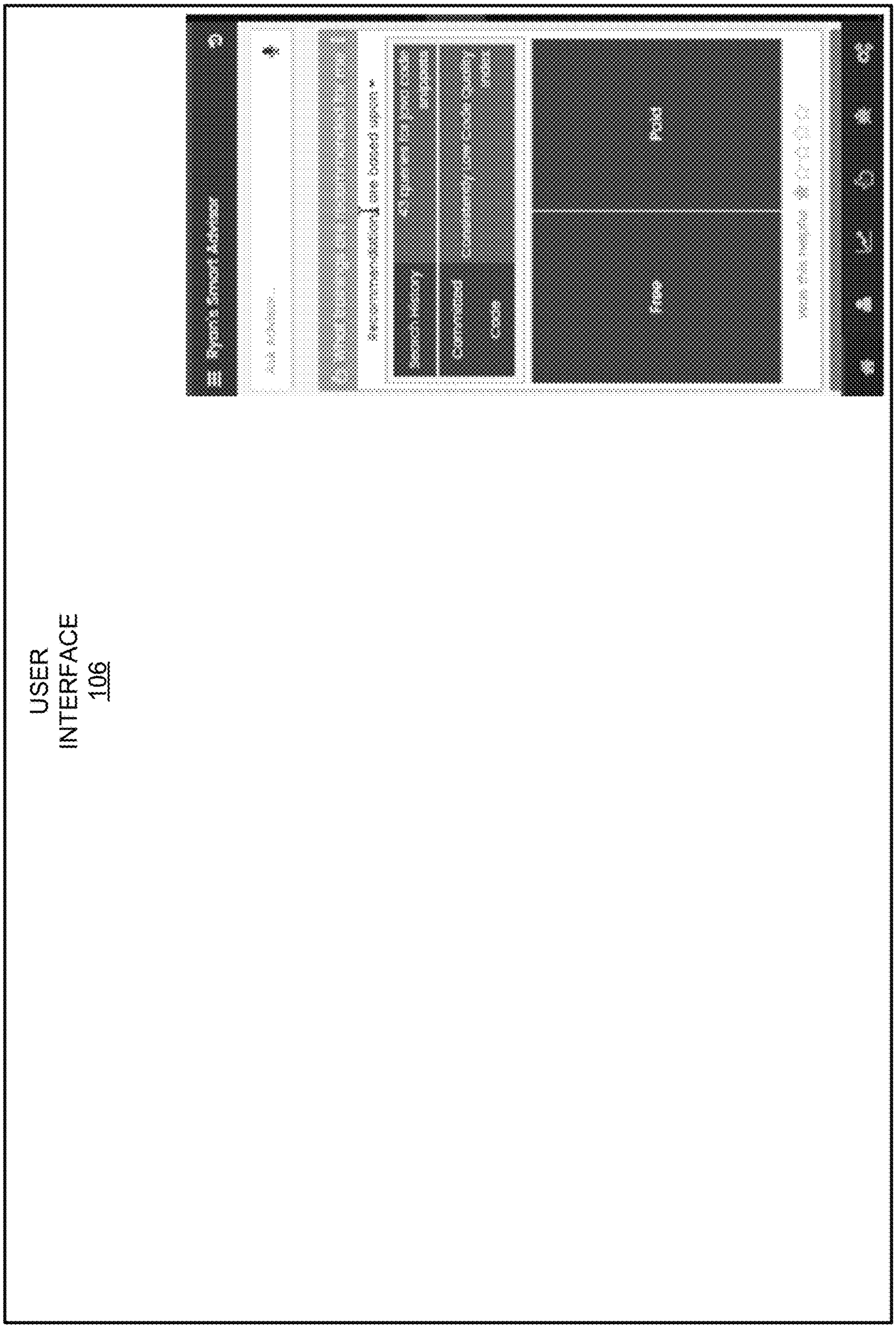
Figure 19:
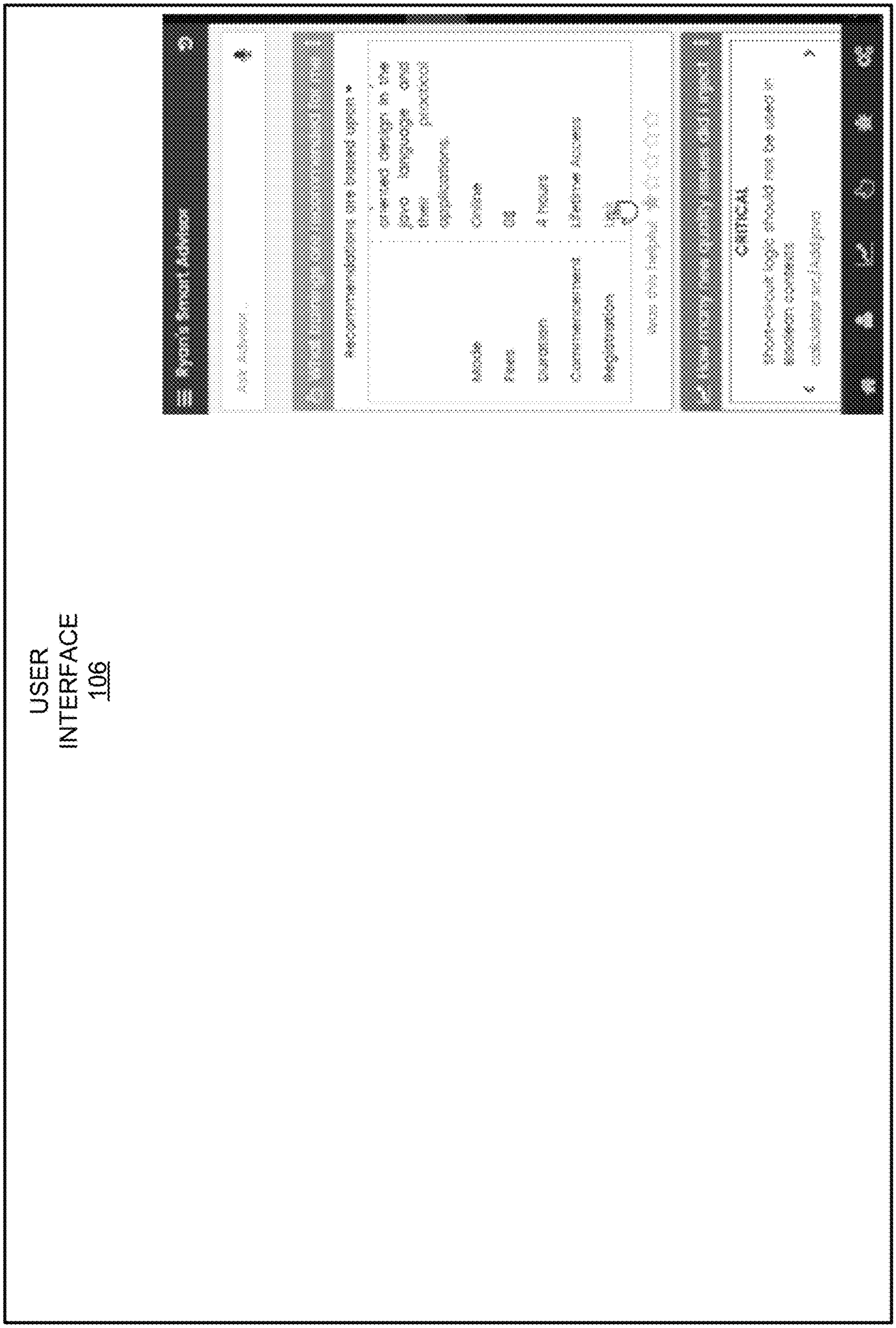
Figure 20:
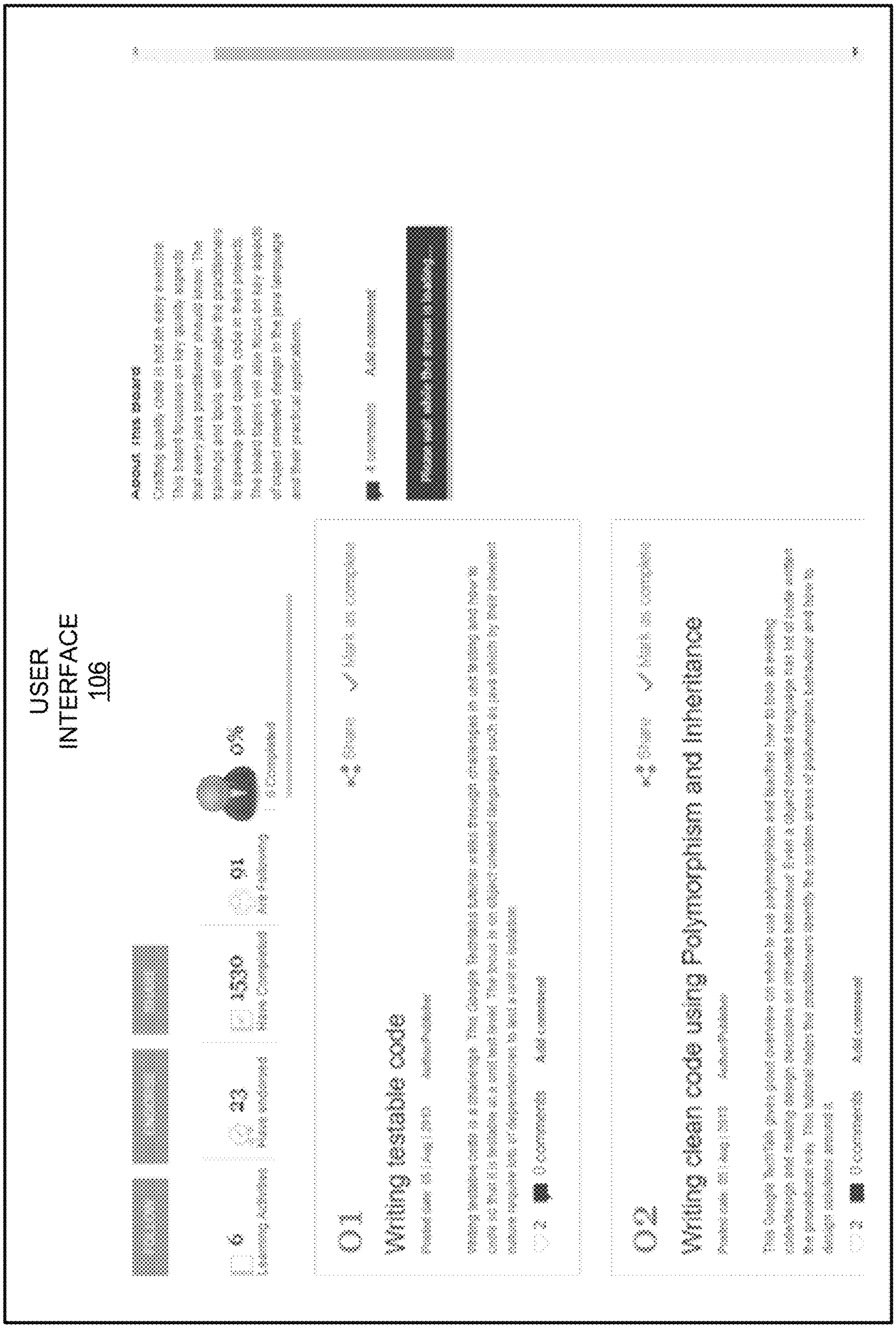
Figure 21:
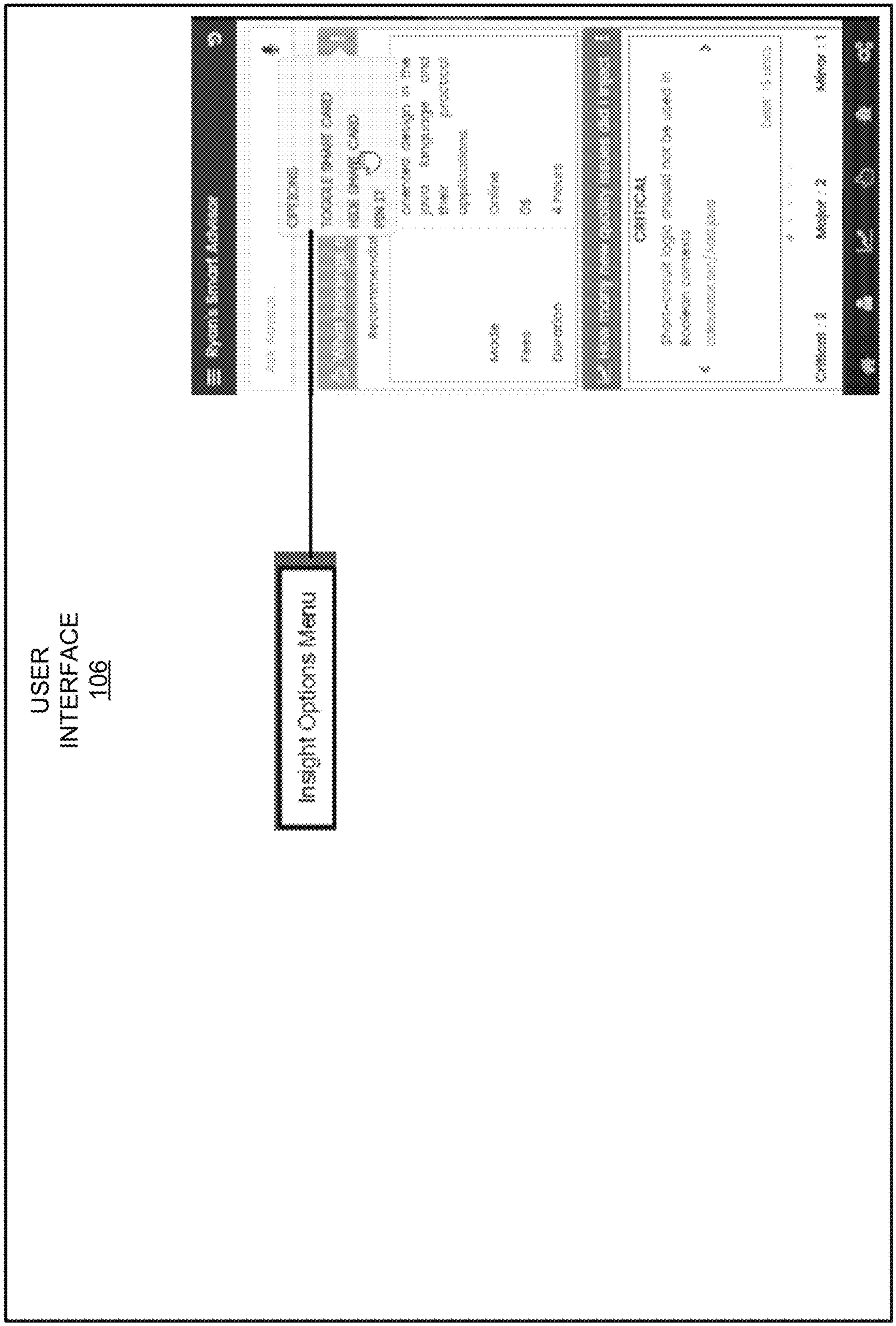
Figure 22:
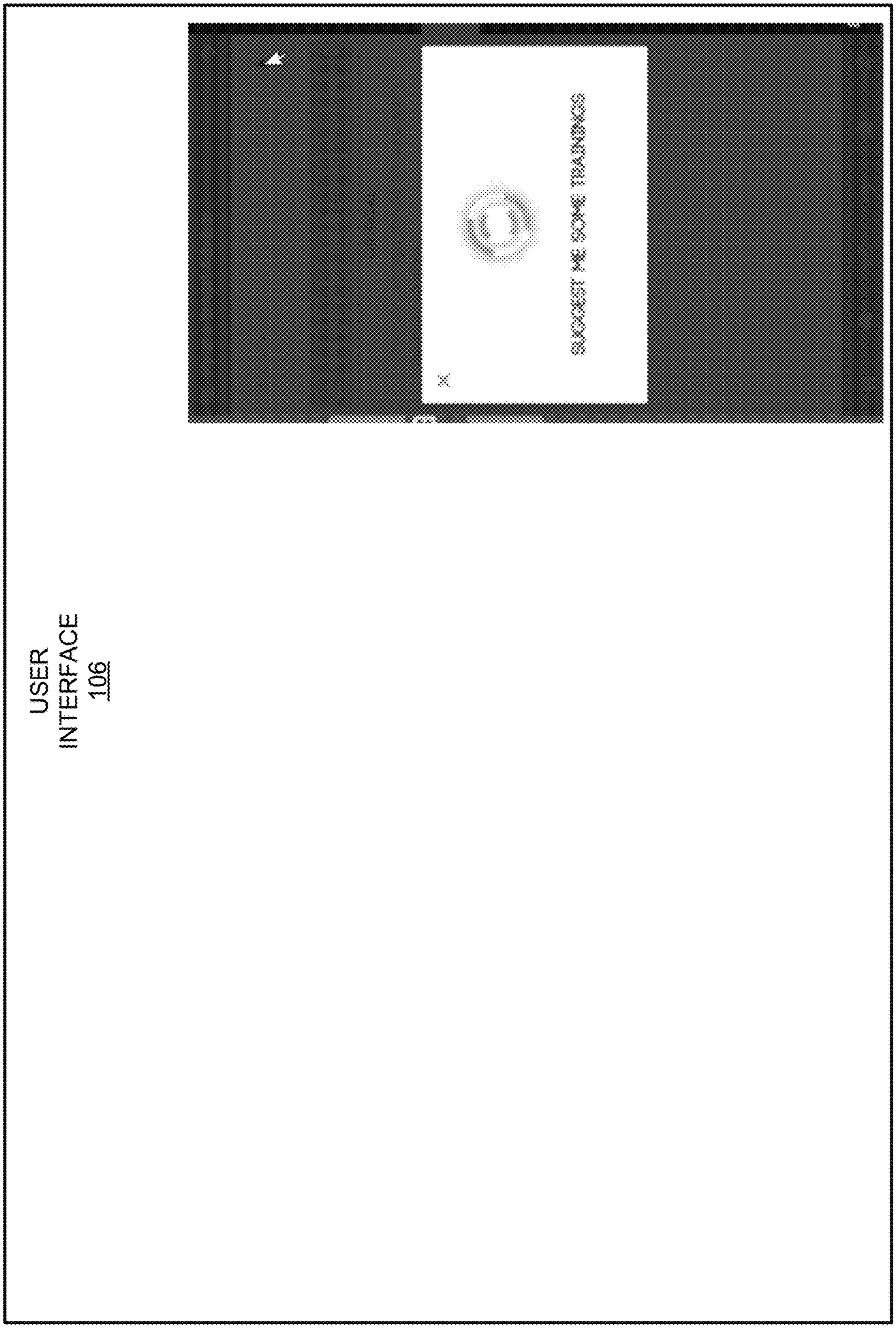
Figure 23:
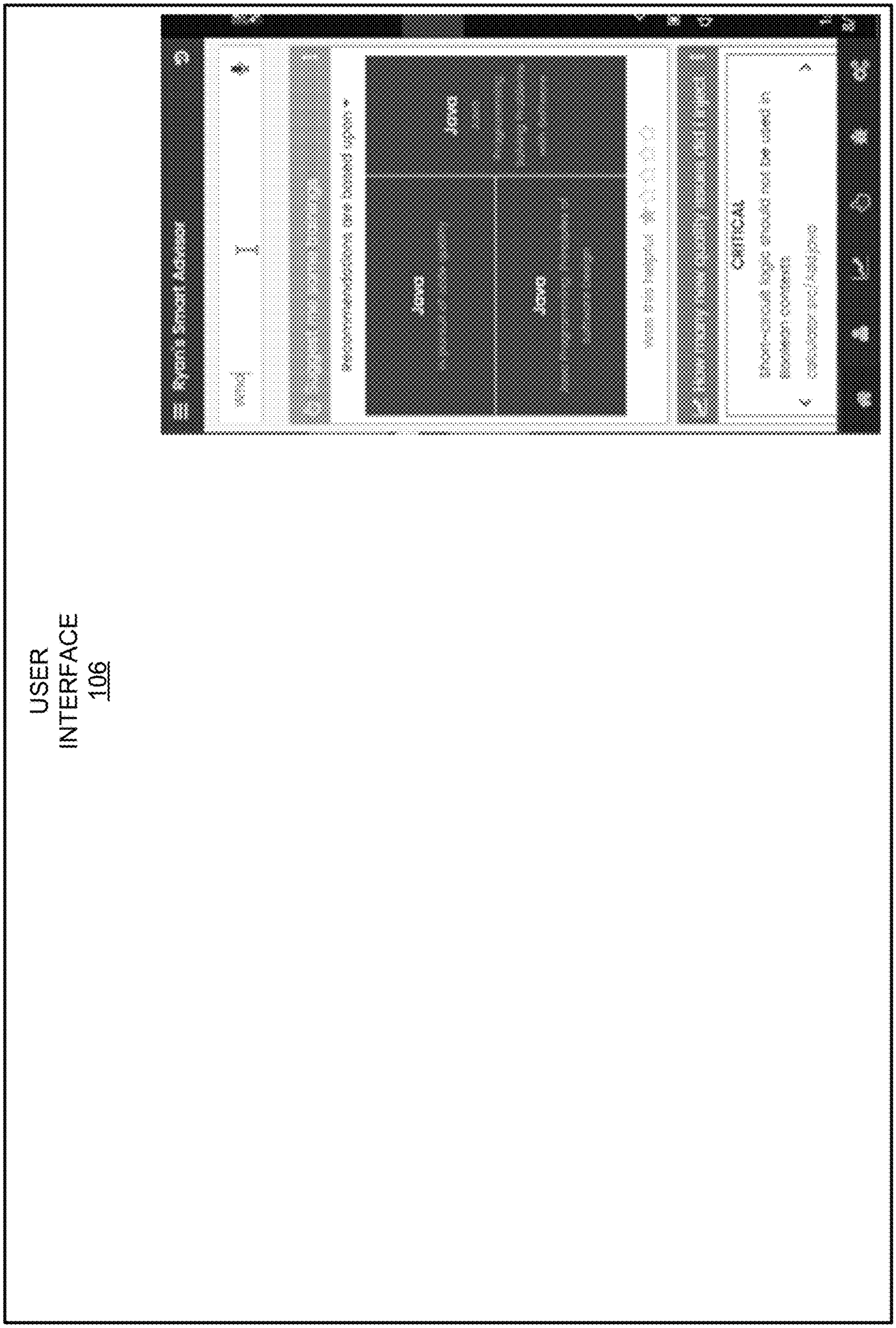
Figure 24:
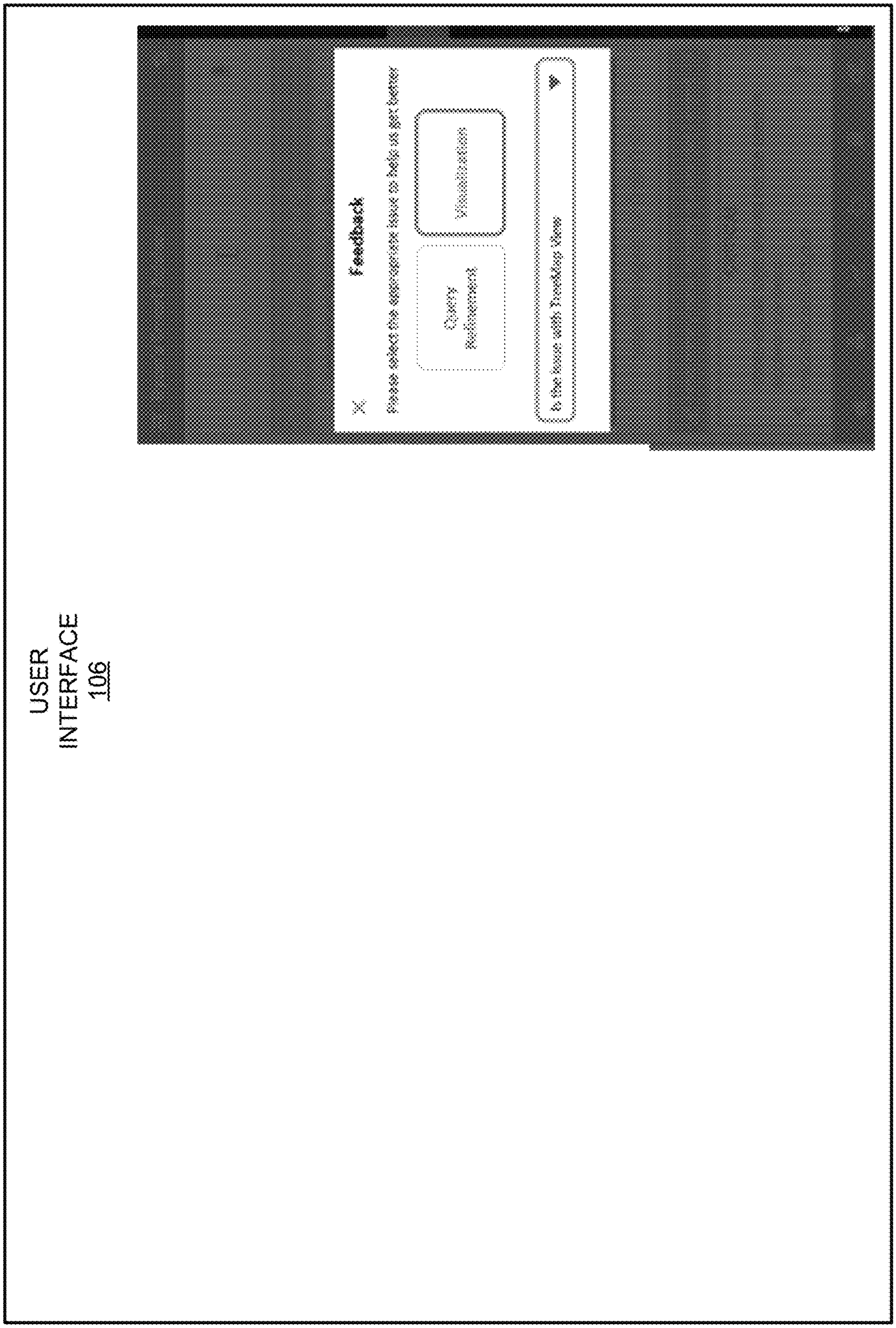
Figure 25:
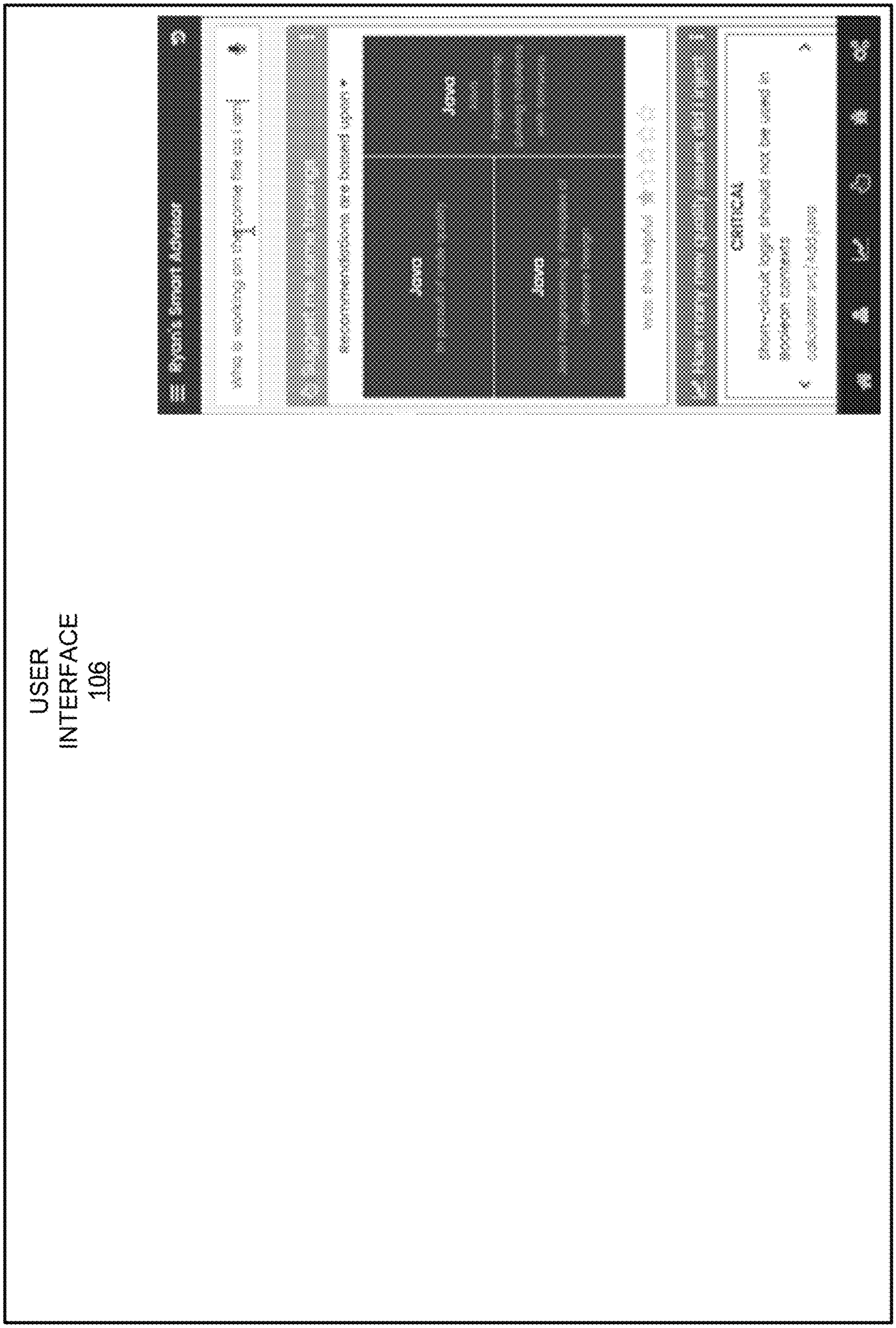
Figure 26:
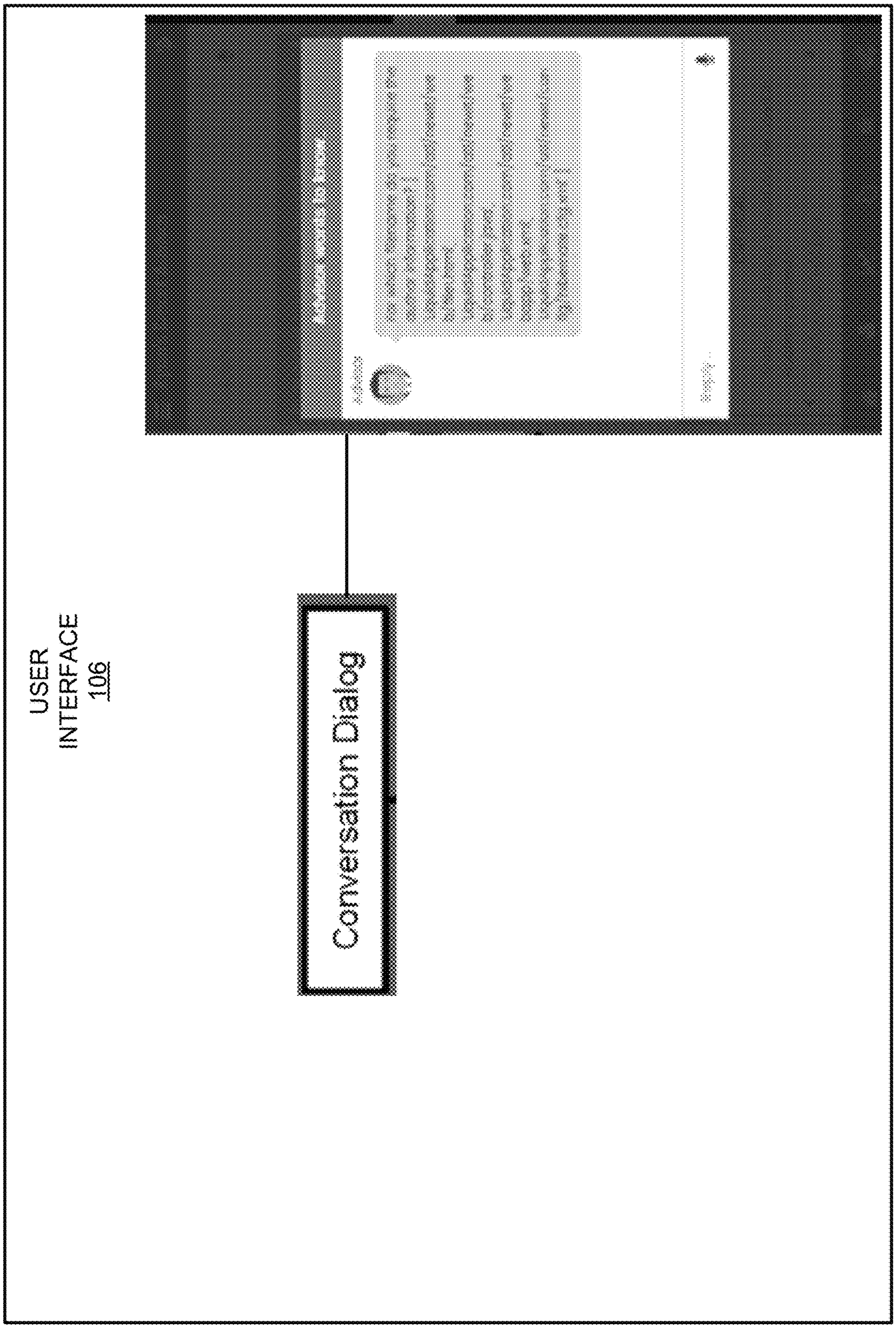
Figure 27:
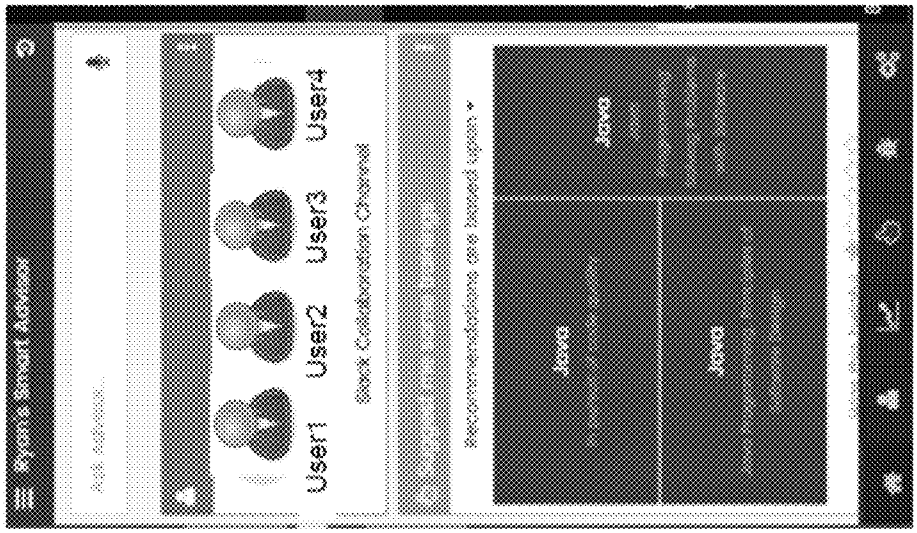
Figure 28:
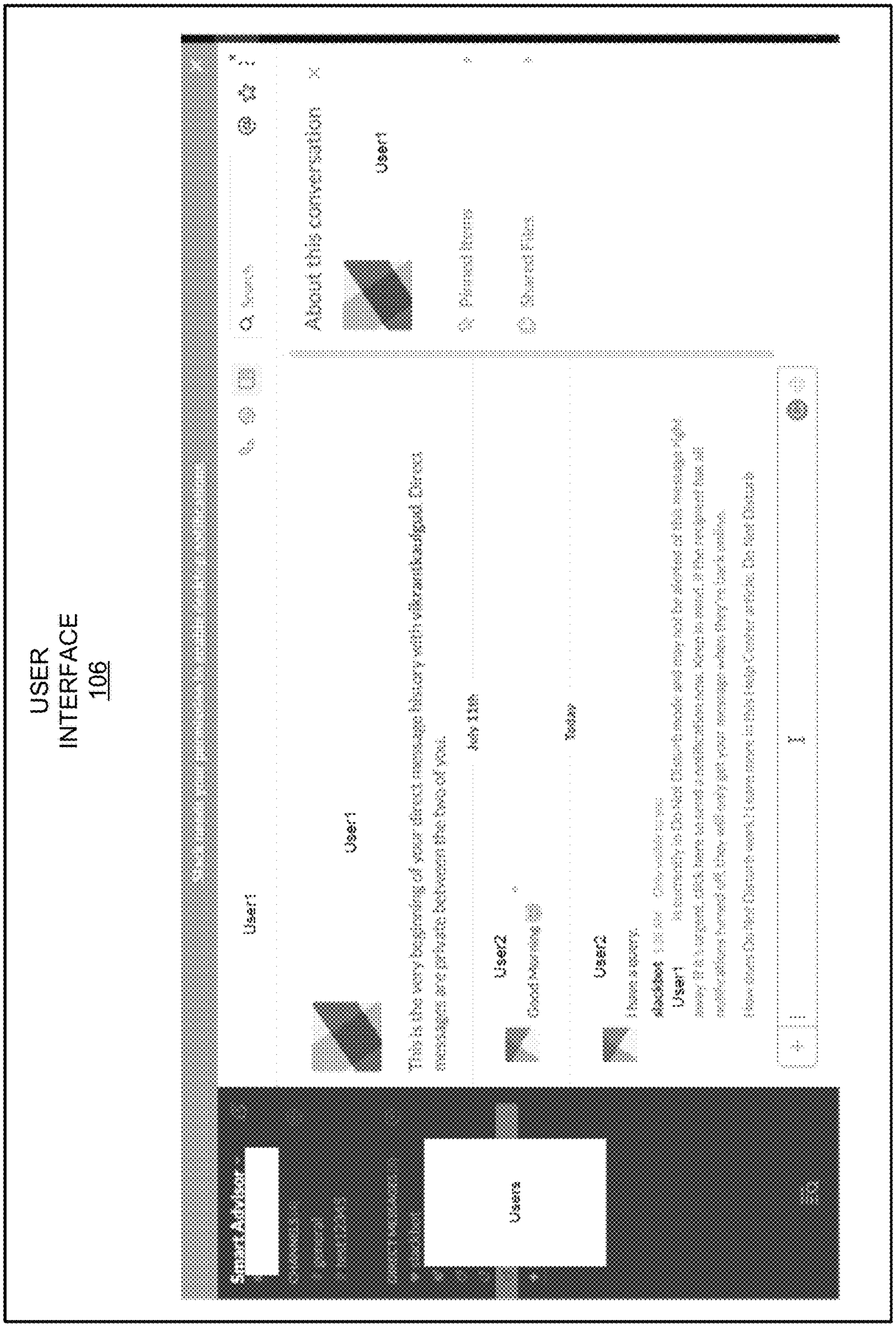

FIGS. 14 and 15 illustrate display of alerts with respect to the user request 104 specified as "How many new quality issues did I inject".

FIGS. 16-21 illustrate guidance associated with a user request 104 specified as "What trainings are recommended for me", and associated visualizations. Selection of the link on FIG. 19 may generate the associated training window illustrated in FIG. 20. In this example, the embellishment includes the addition of a link to the visualization of FIG. 19.

FIGS. 22-28 illustrate various additional types of guidance associated with user requests.

Figure 29:
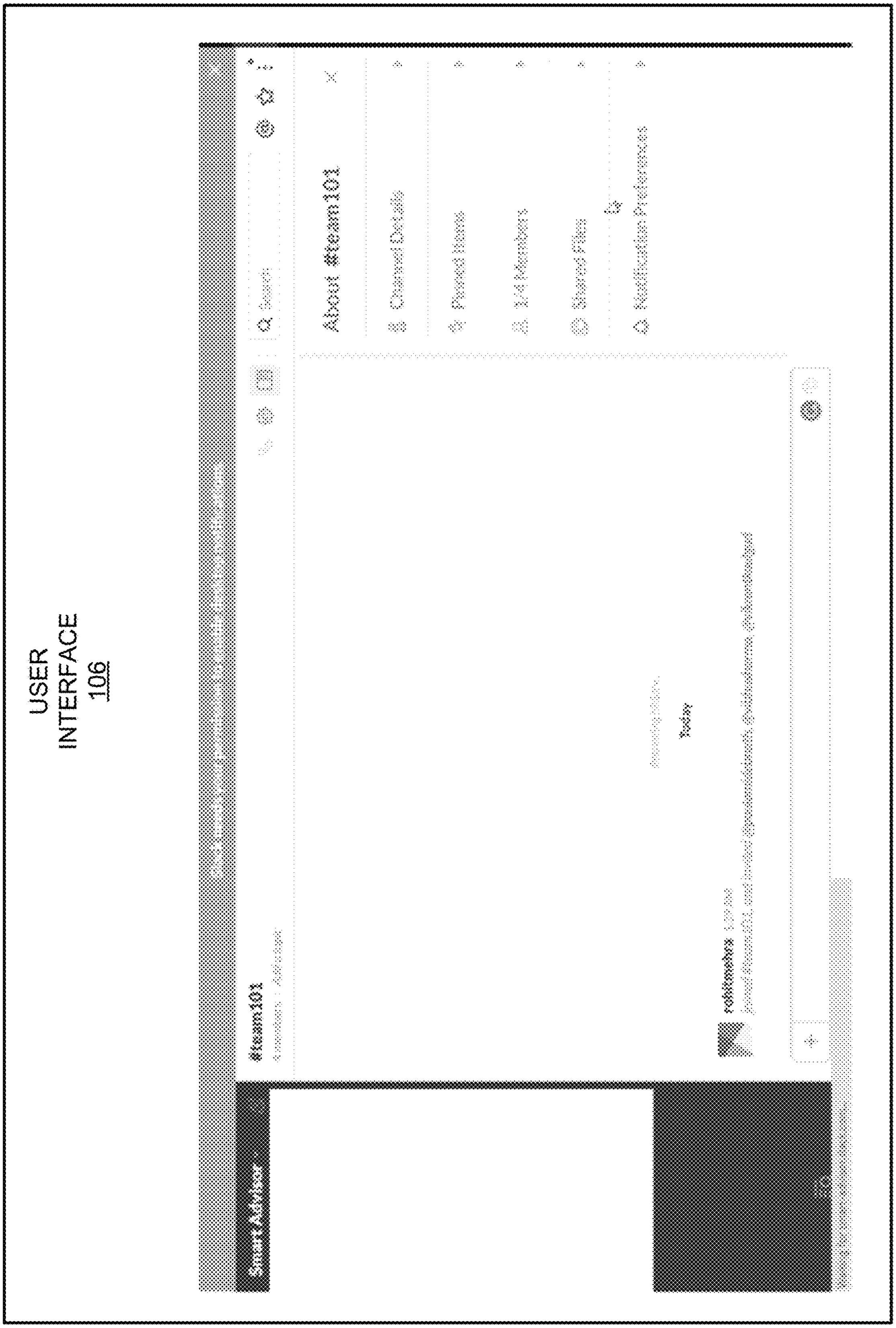
Figure 30:
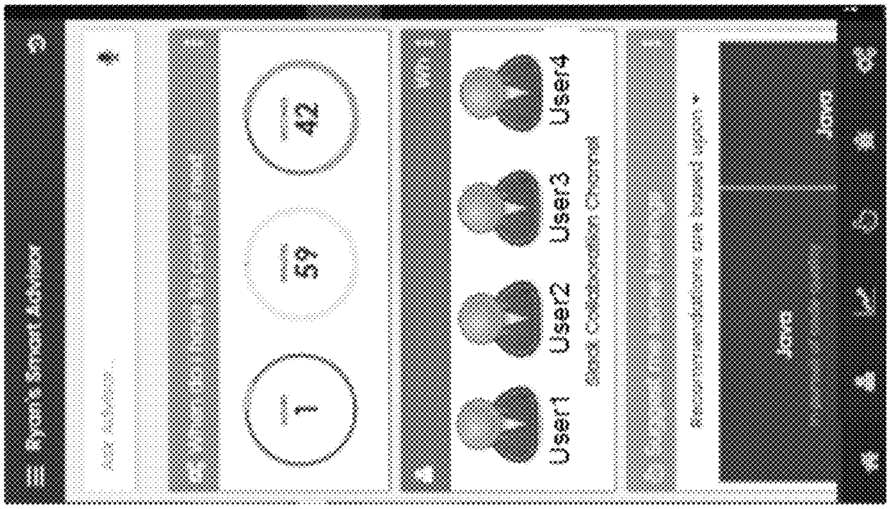
Figure 31:
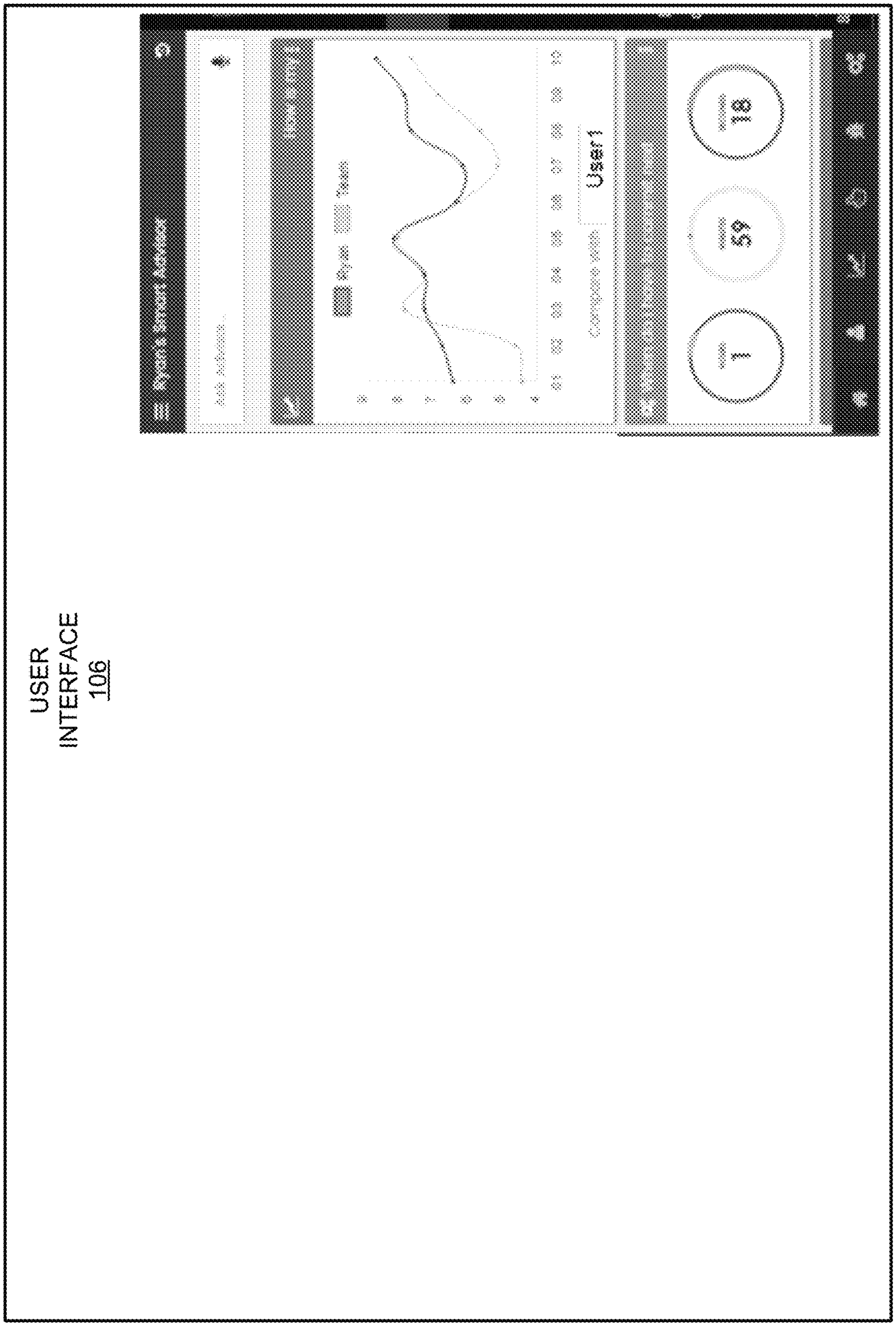
Figure 32:
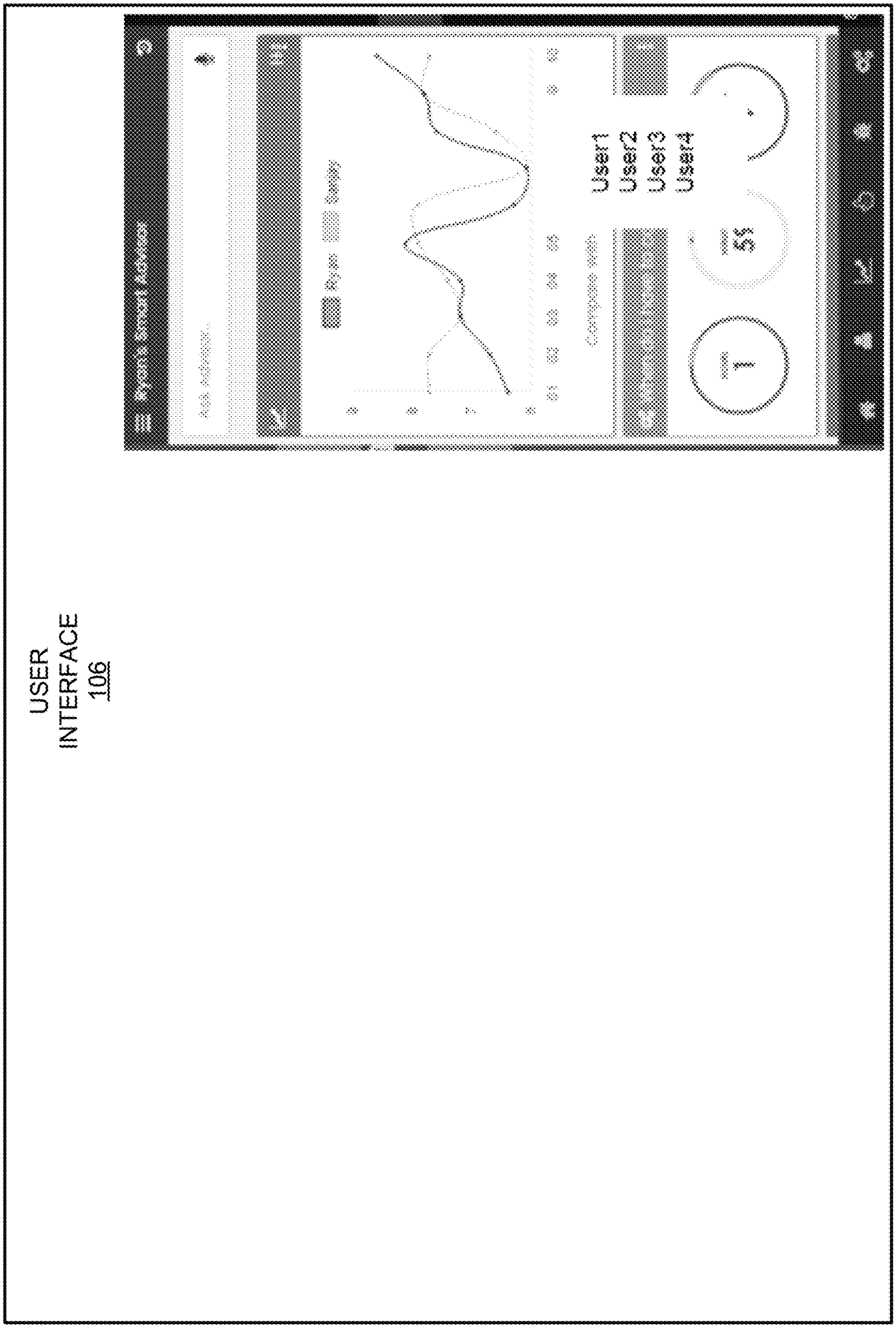
Figure 33:
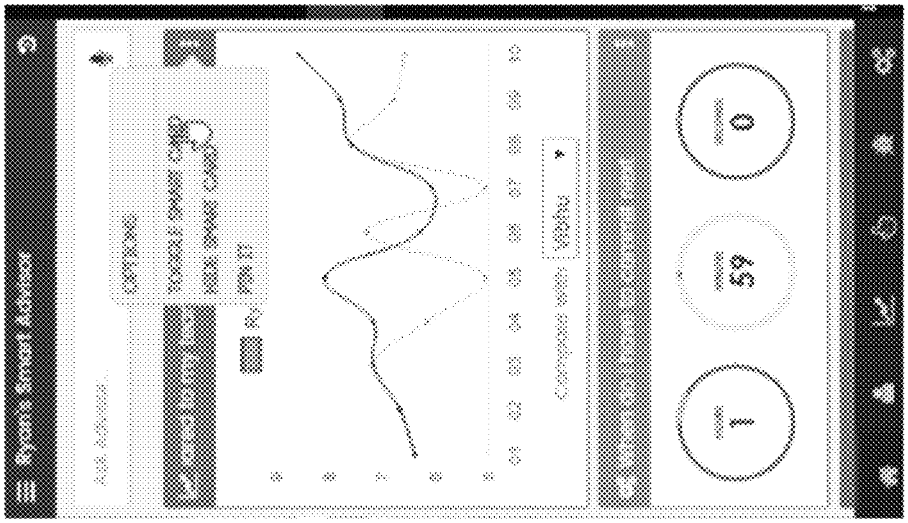

FIGS. 29-37 illustrate various additional types of guidance associated with user requests, and a timer associated with a commit operation. Referring to FIG. 29, an alert pertaining to time left for next code commit, which is a situation that requires immediate user attention, is illustrated. Referring to FIG. 30, with respect to the aspect of a trend, a trend may be described as a variation in code quality violations with time for a particular developer.

Figure 38:
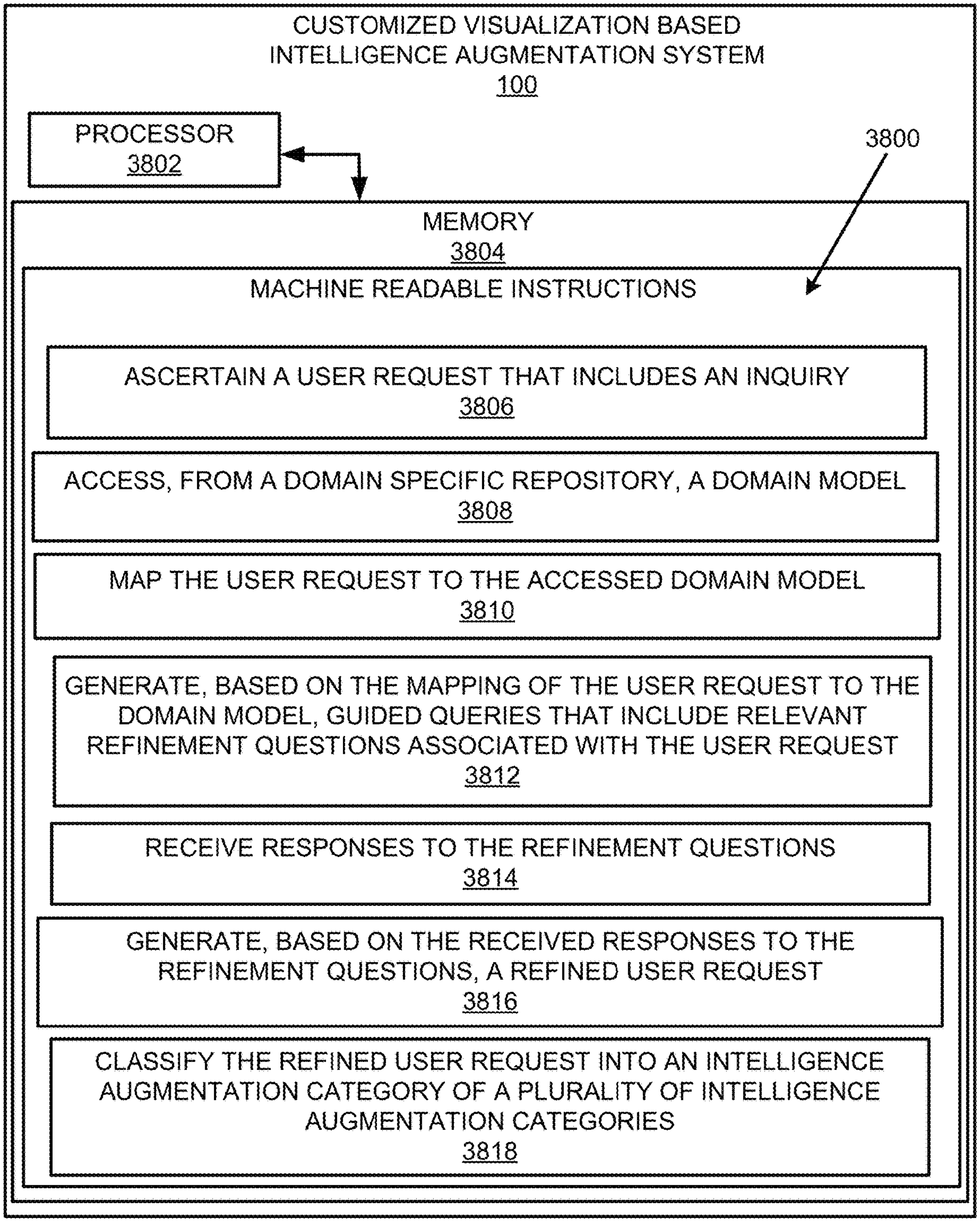
FIG. 38 illustrates a block diagram for customized visualization based intelligence augmentation, according to an example of the present disclosure.
Figure 38:
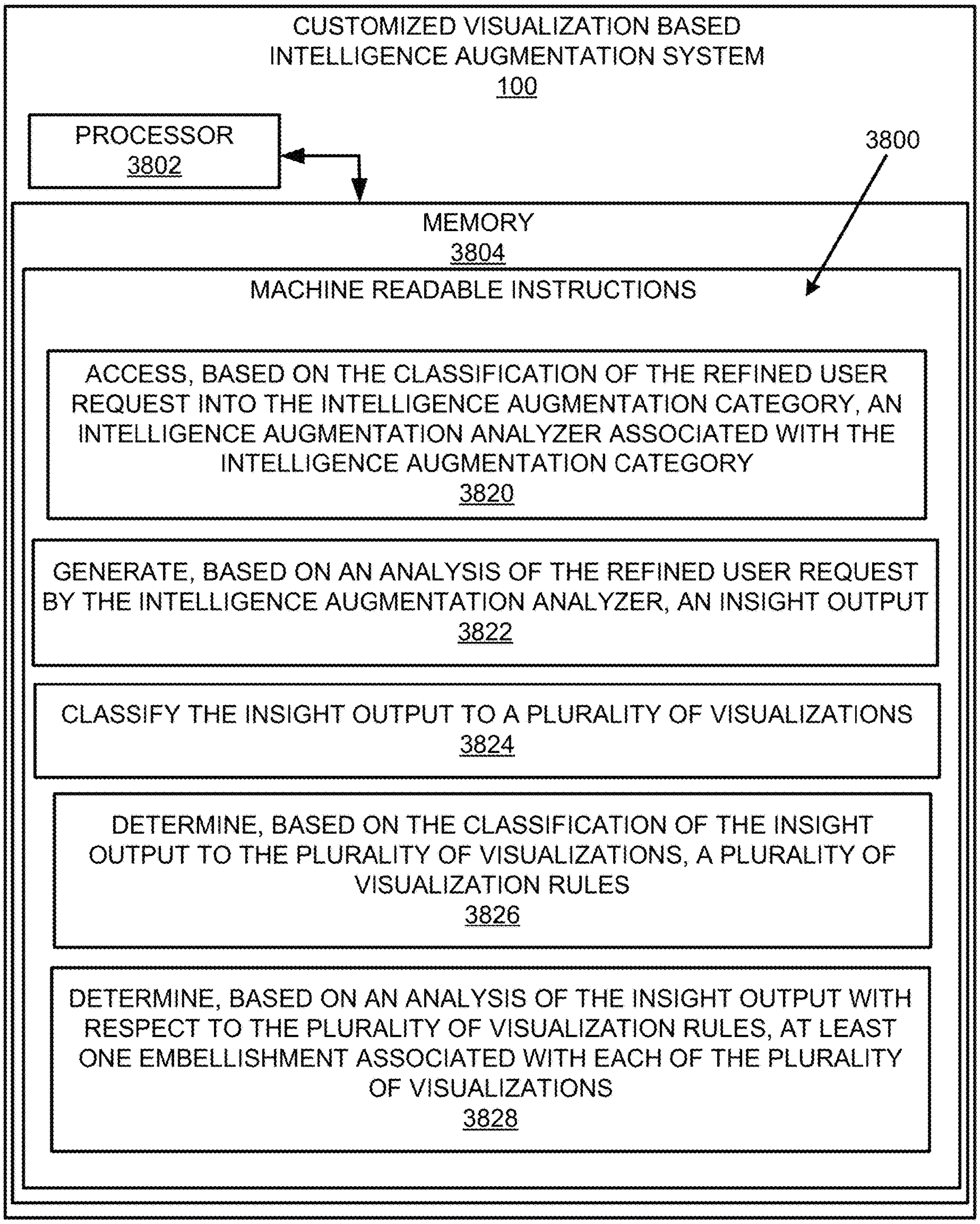
Figure 38:
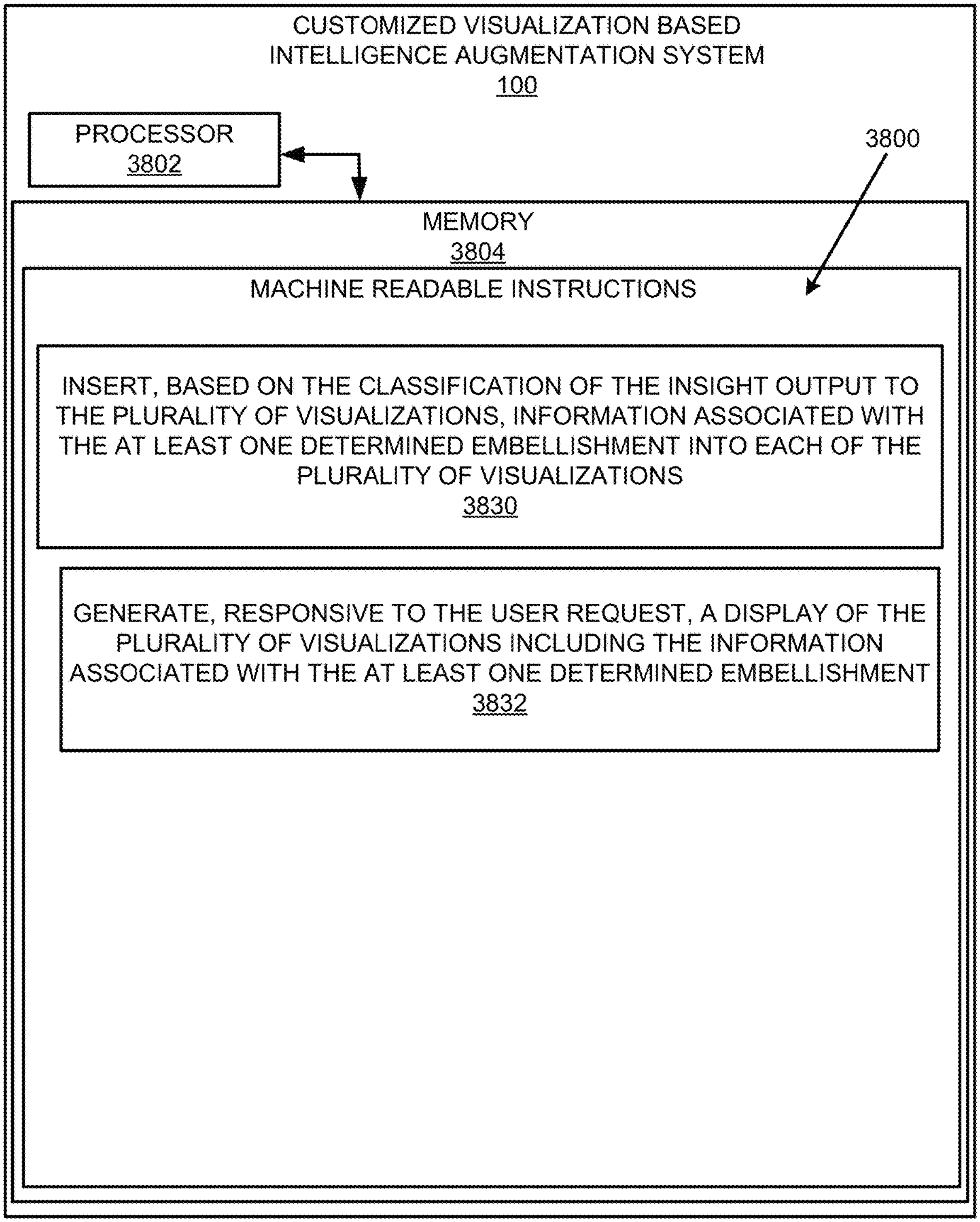
Figure 39:
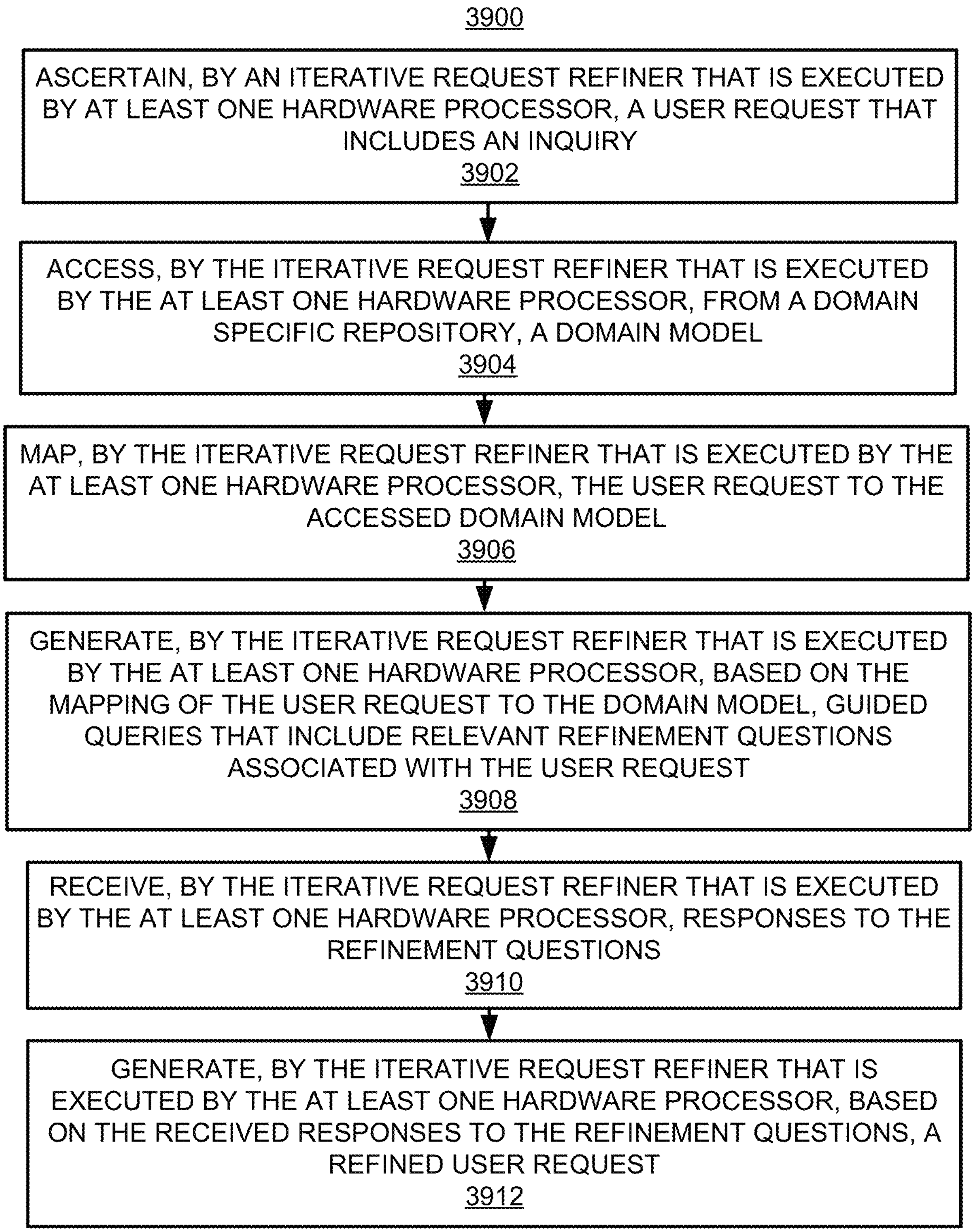
FIG. 39 illustrates a flowchart of a method for customized visualization based intelligence augmentation, according to an example of the present disclosure.
Figure 39:
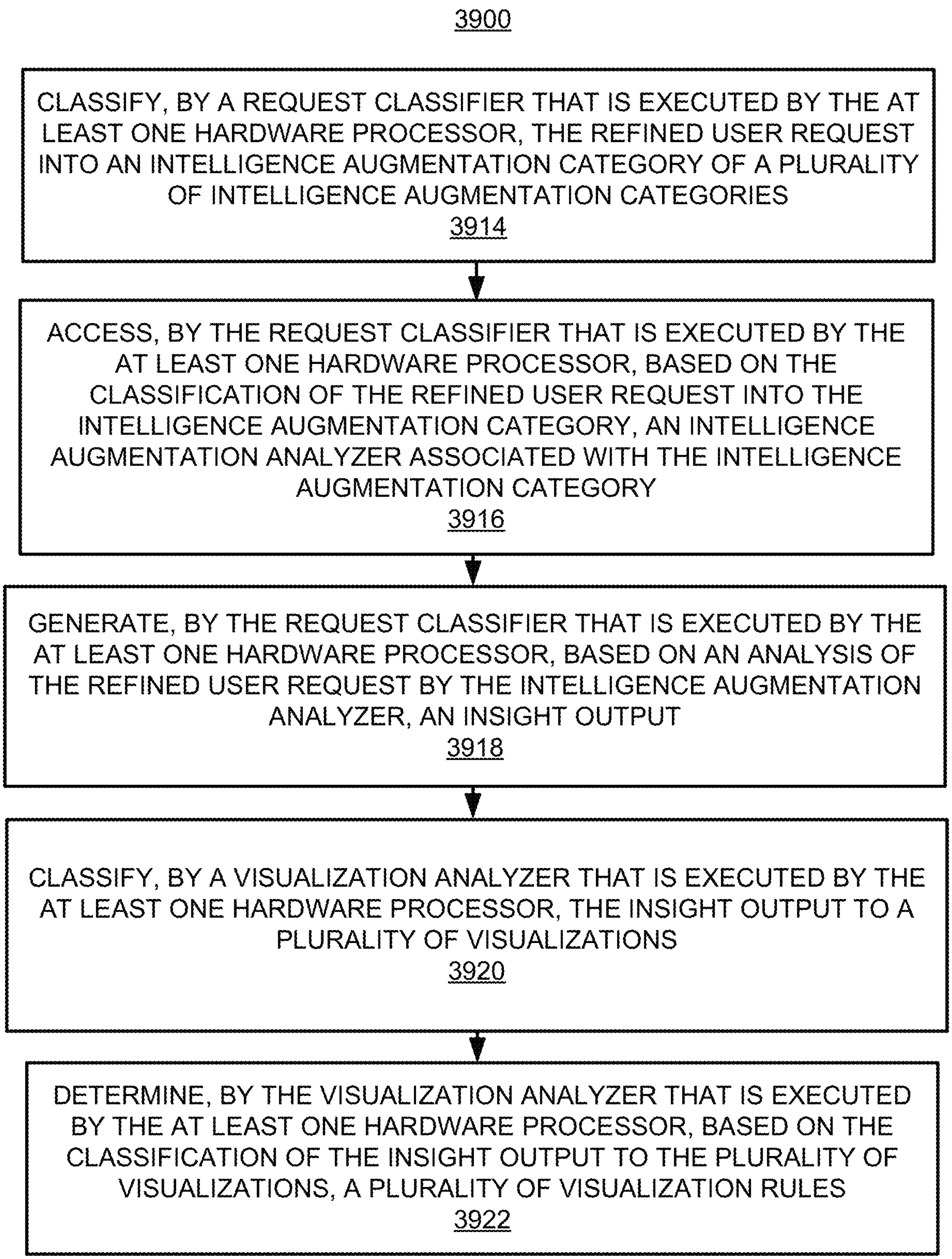
Figure 39:
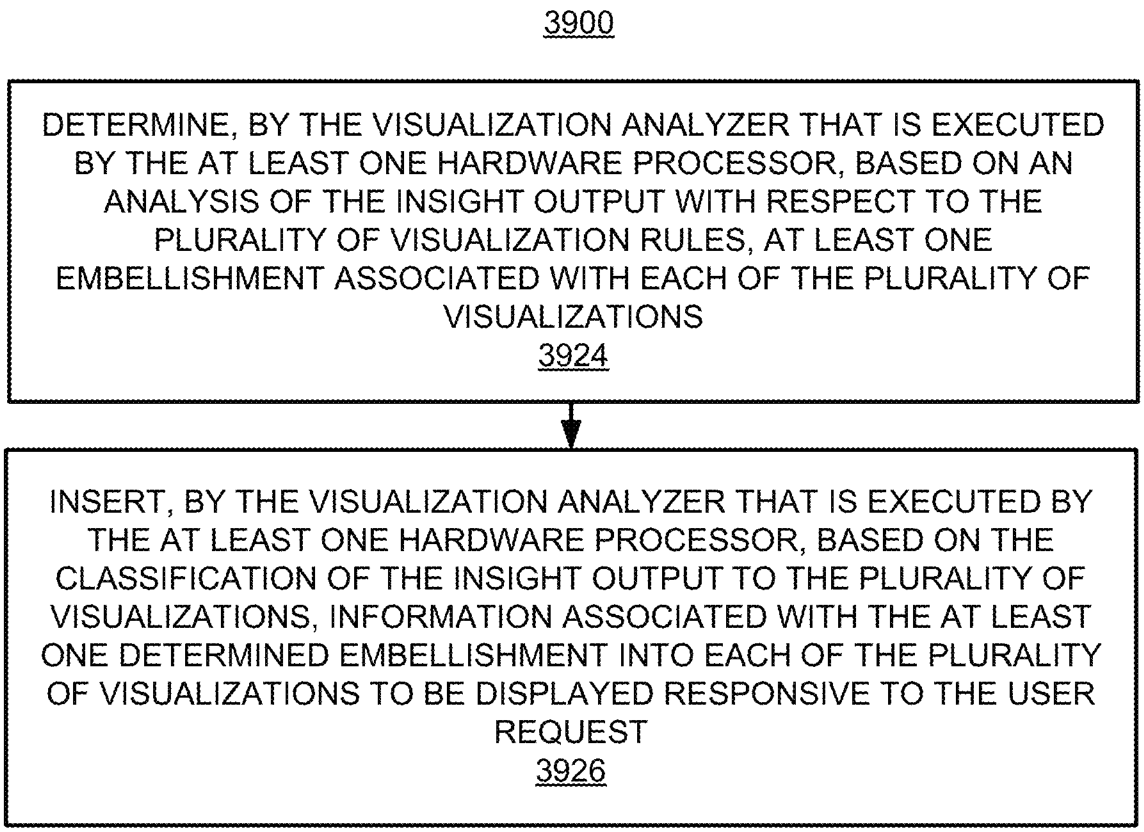
Figure 40:
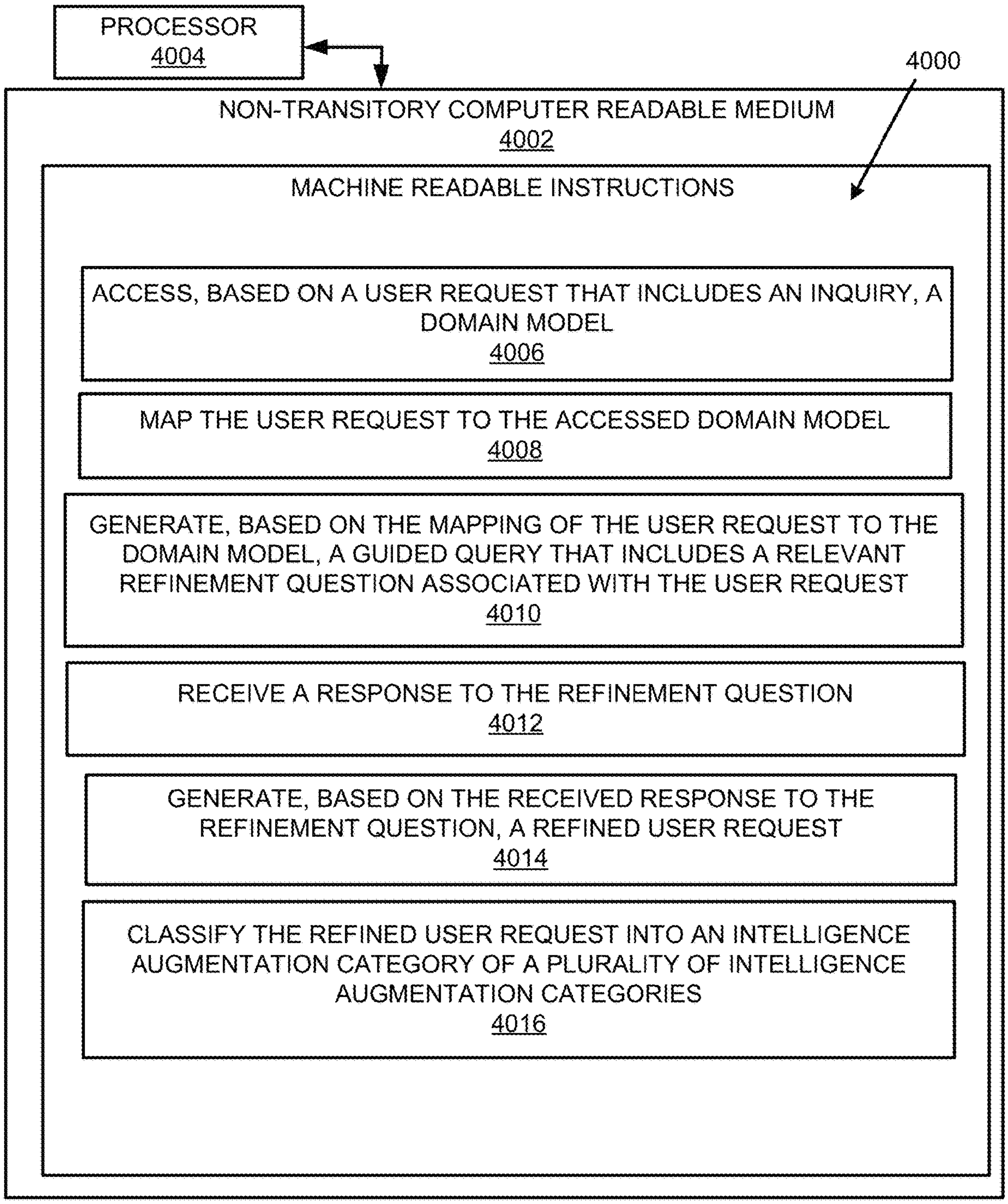
FIG. 40 illustrates a further block diagram for customized visualization based intelligence augmentation, according to an example of the present disclosure.
Figure 40:
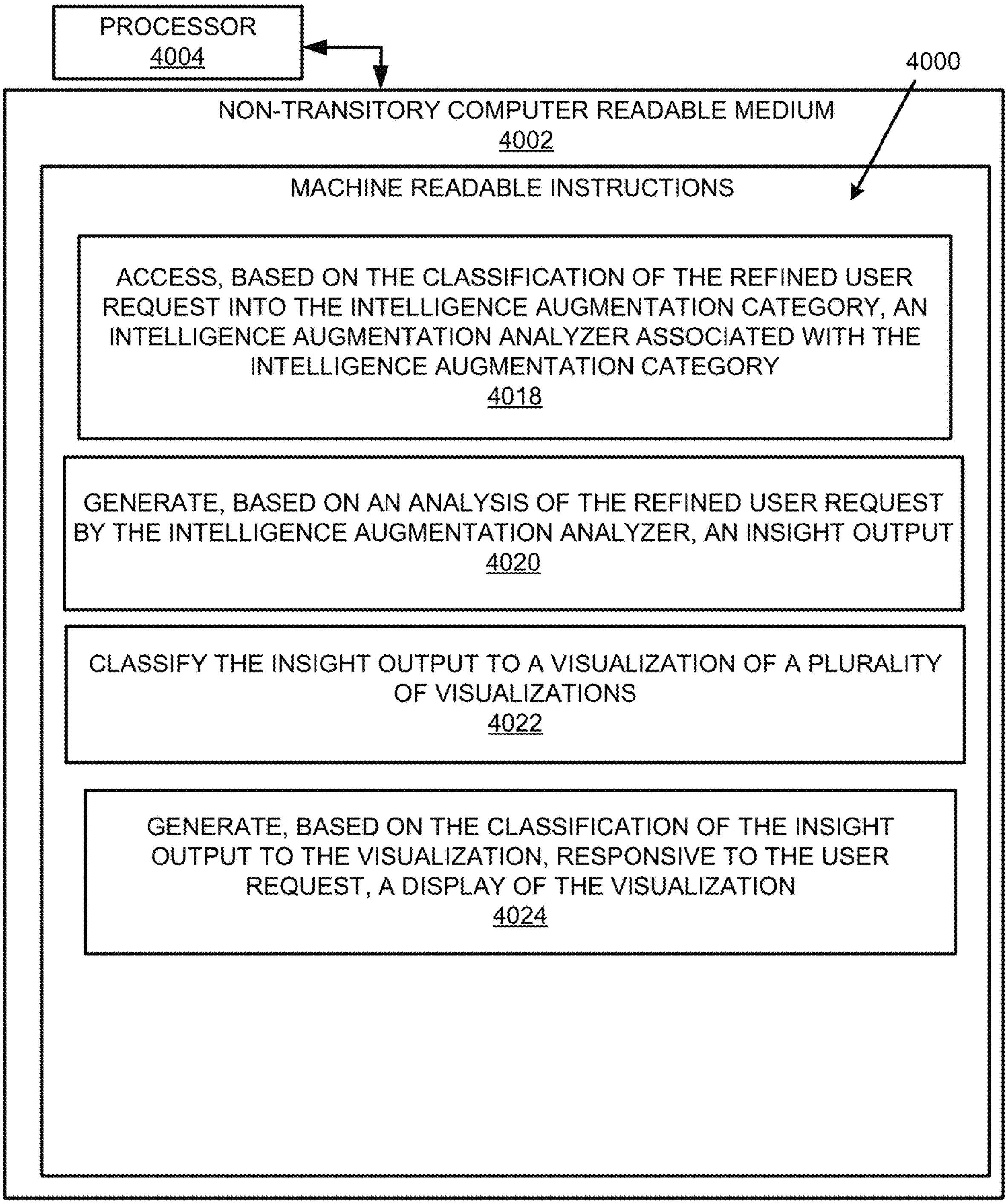

FIGS. 38-40 respectively illustrate a block diagram 3800, a flowchart of a method 3900, and a further block diagram 4000 for customized visualization based intelligence augmentation, according to examples. The block diagram 3800, the method 3900, and the block diagram 4000 may be implemented on the system 100 described above with reference to FIG. 1 by way of example and not limitation. The block diagram 3800, the method 3900, and the block diagram 4000 may be practiced in other systems. In addition to showing the block diagram 3800, FIG. 38 shows hardware of the system 100 that may execute the instructions of the block diagram 3800. The hardware may include a processor 3802, and a memory 3804 storing machine readable instructions that when executed by the processor cause the processor to perform the instructions of the block diagram 3800. The memory 3804 may represent a non-transitory computer readable medium. FIG. 39 may represent a method for customized visualization based intelligence augmentation, and the steps of the method. FIG. 40 may represent a non-transitory computer readable medium 4002 having stored thereon machine readable instructions to provide customized visualization based intelligence augmentation. The machine readable instructions, when executed, cause a processor 4004 to perform the instructions of the block diagram 4000 also shown in

FIG. 40.

The processor 3802 of FIG. 38 and/or the processor 4004 of FIG. 40 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 4002 of FIG. 40), such as hardware storage devices (e.g., RAM (random access memory), ROM (read only memory), EPROM (erasable, programmable ROM), EEPROM (electrically erasable, programmable ROM), hard drives, and flash memory). The memory 3804 may include a RAM, where the machine readable instructions and data for a processor may reside during runtime.

Referring to FIGS. 1-38, and particularly to the block diagram 3800 shown in FIG. 38, the memory 3804 may include instructions 3806 to ascertain a user request that includes an inquiry.

The processor 3802 may fetch, decode, and execute the instructions 3808 to access, from a domain specific repository, a domain model.

The processor 3802 may fetch, decode, and execute the instructions 3810 to map the user request to the accessed domain model.

The processor 3802 may fetch, decode, and execute the instructions 3812 to generate, based on the mapping of the user request to the domain model, guided queries that include relevant refinement questions associated with the user request.

The processor 3802 may fetch, decode, and execute the instructions 3814 to receive responses to the refinement questions.

The processor 3802 may fetch, decode, and execute the instructions 3816 to generate, based on the received responses to the refinement questions, a refined user request.

The processor 3802 may fetch, decode, and execute the instructions 3818 to classify the refined user request into an intelligence augmentation category of a plurality of intelligence augmentation categories.

The processor 3802 may fetch, decode, and execute the instructions 3820 to access, based on the classification of the refined user request into the intelligence augmentation category, an intelligence augmentation analyzer associated with the intelligence augmentation category.

The processor 3802 may fetch, decode, and execute the instructions 3822 to generate, based on an analysis of the refined user request by the intelligence augmentation analyzer, an insight output.

The processor 3802 may fetch, decode, and execute the instructions 3824 to classify the insight output to a plurality of visualizations.

The processor 3802 may fetch, decode, and execute the instructions 3826 to determine, based on the classification of the insight output to the plurality of visualizations, a plurality of visualization rules.

The processor 3802 may fetch, decode, and execute the instructions 3828 to determine, based on an analysis of the insight output with respect to the plurality of visualization rules, at least one embellishment associated with each of the plurality of visualizations.

The processor 3802 may fetch, decode, and execute the instructions 3830 to insert, based on the classification of the insight output to the plurality of visualizations, information associated with the at least one determined embellishment into each of the plurality of visualizations.

The processor 3802 may fetch, decode, and execute the instructions 3832 to generate, responsive to the user request, a display of the plurality of visualizations including the information associated with the at least one determined embellishment.

Referring to FIGS. 1-37 and 39, and particularly FIG. 39, for the method 3900, at block 3902, the method may include ascertaining, by an iterative request refiner that is executed by at least one hardware processor, a user request that includes an inquiry.

At block 3904, the method may include accessing, by the iterative request refiner that is executed by the at least one hardware processor, from a domain specific repository, a domain model.

At block 3906, the method may include mapping, by the iterative request refiner that is executed by the at least one hardware processor, the user request to the accessed domain model.

At block 3908, the method may include generating, by the iterative request refiner that is executed by the at least one hardware processor, based on the mapping of the user request to the domain model, guided queries that include relevant refinement questions associated with the user request.

At block 3910, the method may include receiving, by the iterative request refiner that is executed by the at least one hardware processor, responses to the refinement questions.

At block 3912, the method may include generating, by the iterative request refiner that is executed by the at least one hardware processor, based on the received responses to the refinement questions, a refined user request.

At block 3914, the method may include classifying, by a request classifier that is executed by the at least one hardware processor, the refined user request into an intelligence augmentation category of a plurality of intelligence augmentation categories.

At block 3916, the method may include accessing, by the request classifier that is executed by the at least one hardware processor, based on the classification of the refined user request into the intelligence augmentation category, an intelligence augmentation analyzer associated with the intelligence augmentation category.

At block 3918, the method may include generating, by the request classifier that is executed by the at least one hardware processor, based on an analysis of the refined user request by the intelligence augmentation analyzer, an insight output.

At block 3920, the method may include classifying, by a visualization analyzer that is executed by the at least one hardware processor, the insight output to a plurality of visualizations.

At block 3922, the method may include determining, by the visualization analyzer that is executed by the at least one hardware processor, based on the classification of the insight output to the plurality of visualizations, a plurality of visualization rules.

At block 3924, the method may include determining, by the visualization analyzer that is executed by the at least one hardware processor, based on an analysis of the insight output with respect to the plurality of visualization rules, at least one embellishment associated with each of the plurality of visualizations.

At block 3926, the method may include inserting, by the visualization analyzer that is executed by the at least one hardware processor, based on the classification of the insight output to the plurality of visualizations, information associated with the at least one determined embellishment into each of the plurality of visualizations to be displayed responsive to the user request.

Referring to FIGS. 1-37 and 40, and particularly FIG. 40, for the block diagram 4000, the non-transitory computer readable medium 4002 may include instructions 4006 to access, based on a user request that includes an inquiry, a domain model.

The processor 4004 may fetch, decode, and execute the instructions 4008 to map the user request to the accessed domain model.

The processor 4004 may fetch, decode, and execute the instructions 4010 to generate, based on the mapping of the user request to the domain model, a guided query that includes a relevant refinement question associated with the user request.

The processor 4004 may fetch, decode, and execute the instructions 4012 to receive a response to the refinement question.

The processor 4004 may fetch, decode, and execute the instructions 4014 to generate, based on the received response to the refinement question, a refined user request.

The processor 4004 may fetch, decode, and execute the instructions 4016 to classify the refined user request into an intelligence augmentation category of a plurality of intelligence augmentation categories.

The processor 4004 may fetch, decode, and execute the instructions 4018 to access, based on the classification of the refined user request into the intelligence augmentation category, an intelligence augmentation analyzer associated with the intelligence augmentation category.

The processor 4004 may fetch, decode, and execute the instructions 4020 to generate, based on an analysis of the refined user request by the intelligence augmentation analyzer, an insight output.

The processor 4004 may fetch, decode, and execute the instructions 4022 to classify the insight output to a visualization of a plurality of visualizations.

The processor 4004 may fetch, decode, and execute the instructions 4024 to generate, based on the classification of the insight output to the visualization, responsive to the user request, a display of the visualization.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A customized visualization based intelligence augmentation system comprising:

an iterative request refiner, executed by at least one hardware processor, to ascertain a user request that includes an inquiry, and generate, based on modification of the user request, a refined user request; and a visualization analyzer, executed by the at least one hardware processor, to insert, based on an analysis of the refined user request, information associated with at least one determined embellishment into each of a plurality of visualizations, and generate, responsive to the user request, a display of the plurality of visualizations including the information associated with the at least one determined embellishment.

2. The customized visualization based intelligence augmentation system according to claim 1, wherein the iterative request refiner is executed by the at least one hardware processor to:

identify, based on an analysis of words of the user request, nodes from a set of nodes of a domain model;

determine, based on an analysis of the words of the user request, a relationship between the identified nodes, wherein the domain model includes edges that represent relationships between each node of the set of nodes;

identify instance values associated with the identified nodes; and utilize the instance values and the determined relationship between the identified nodes to generate a guided query of guided queries that include relevant refinement questions associated with the user request.

3. The customized visualization based intelligence augmentation system according to claim 2, wherein the guided query includes selection of an instance value of the instance values.

4. The customized visualization based intelligence augmentation system according to claim 2, wherein the iterative request refiner is executed by the at least one hardware processor to:

generate, based on received responses to the refinement questions, the refined user request by:

generating, based on a received response to the guided query, an intermediate refined user request;

determining, based on traversal of the domain model from the identified nodes and the determined relationship, a further node from the set of nodes;

determining, based on an analysis of the words of the intermediate refined user request, a further relationship between the identified nodes and the further determined node;

identifying further instance values associated with the further determined node; and utilizing the further instance values and the further relationship between the identified nodes and the further determined node to generate a further guided query of the guided queries that include relevant refinement questions associated with the intermediate refined user request.

5. The customized visualization based intelligence augmentation system according to claim 1, further comprising:

a request classifier, executed by the at least one hardware processor, to classify the refined user request into an intelligence augmentation category of a plurality of intelligence augmentation categories that include awareness that includes the user request for information on a past or present portion of a state of a project, alert that includes the user request for information to be provided when a condition based on a portion of the state of the project becomes true, and advice that includes the user request for information related to at least one of an assumed and a hypothetical state of the project, or for an action that is to occur.

6. The customized visualization based intelligence augmentation system according to claim 1, further comprising:

a request classifier, executed by the at least one hardware processor, to generate, based on an analysis of the refined user request by an intelligence augmentation analyzer, an insight output that includes:

an insight output type that represents a format of the insight output, a size of the insight output that includes a number of distinct outputs included in the insight output, and a visualization type that represents a format of the plurality of visualizations.

7. The customized visualization based intelligence augmentation system according to claim 6, wherein the visualization analyzer is executed by the at least one hardware processor to:

classify the insight output to the plurality of visualizations by classifying, based on the insight output type and the size of the insight output, the insight output to the plurality of visualizations.

8. The customized visualization based intelligence augmentation system according to claim 6, wherein the visualization analyzer is executed by the at least one hardware processor, to:

determine, based on an analysis of the insight output with respect to a plurality of visualization rules, the at least one embellishment associated with each of the plurality of visualizations by determining, based on an analysis of the size of the insight output with respect to the plurality of visualization rules, whether the visualization type is to be embellished by modifying the visualization type.

9. The customized visualization based intelligence augmentation system according to claim 6, wherein the visualization analyzer is executed by the at least one hardware processor, to:

determine, based on an analysis of the insight output with respect to a plurality of visualization rules, the at least one embellishment associated with each of the plurality of visualizations by:

determining, based on the analysis of the insight output with respect to the plurality of visualization rules, whether a collaboration option is to be added to each of the plurality of visualizations.

10. The customized visualization based intelligence augmentation system according to claim 6, wherein the visualization analyzer is executed by the at least one hardware processor, to:

determine, based on an analysis of the insight output with respect to a plurality of visualization rules, the at least one embellishment associated with each of the plurality of visualizations by:

determining, based on the analysis of the insight output with respect to the plurality of visualization rules, whether user profile images are to be added to each of the plurality of visualizations.

11. A method for customized visualization based intelligence augmentation, the method comprising:

ascertaining, by an iterative request refiner that is executed by at least one hardware processor, a user request that includes an inquiry;

generating, by the iterative request refiner that is executed by the at least one hardware processor, based on modification of the user request, a refined user request; and inserting, by a visualization analyzer that is executed by the at least one hardware processor, based on an analysis of the refined user request, information associated with at least one determined embellishment into each of a plurality of visualizations to be displayed responsive to the user request.

12. The method according to claim 11, further comprising:

generating, by the visualization analyzer that is executed by the at least one hardware processor, responsive to the user request, a display of the plurality of visualizations including the information associated with the at least one determined embellishment.

13. The method according to claim 11, further comprising:

identifying, by the iterative request refiner that is executed by the at least one hardware processor, based on an analysis of words of the user request, nodes from a set of nodes of a domain model;

determining, by the iterative request refiner that is executed by the at least one hardware processor, based on an analysis of the words of the user request, a relationship between the identified nodes, wherein the domain model includes edges that represent relationships between each node of the set of nodes;

identifying, by the iterative request refiner that is executed by the at least one hardware processor, instance values associated with the identified nodes; and utilizing, by the iterative request refiner that is executed by the at least one hardware processor, the instance values and the determined relationship between the identified nodes to generate a guided query of guided queries that include relevant refinement questions associated with the user request.

14. The method according to claim 13, further comprising:

generating, by the iterative request refiner that is executed by the at least one hardware processor, based on a received response to the guided query, an intermediate refined user request;

determining, by the iterative request refiner that is executed by the at least one hardware processor, based on traversal of the domain model from the identified nodes and the determined relationship, a further node from the set of nodes;

determining, by the iterative request refiner that is executed by the at least one hardware processor, based on an analysis of the words of the intermediate refined user request, a further relationship between the identified nodes and the further determined node;

identifying, by the iterative request refiner that is executed by the at least one hardware processor, further instance values associated with the further determined node; and utilizing, by the iterative request refiner that is executed by the at least one hardware processor, the further instance values and the further relationship between the identified nodes and the further determined node to generate a further guided query of the guided queries that include relevant refinement questions associated with the intermediate refined user request.

15. A non-transitory computer readable medium having stored thereon machine readable instructions for customized visualization based intelligence augmentation, the machine readable instructions, when executed, cause a processor to:

ascertain, a user request that includes an inquiry;

generate, based on modification of the user request, a refined user request; and insert, based on an analysis of the refined user request relative to a domain model, information associated with at least one determined embellishment into each of a plurality of visualizations to be displayed responsive to the user request.

16. The non-transitory computer readable medium of claim 15, wherein the machine readable instructions, when executed, further cause the processor to:

determine, based on classification of an insight output to a visualization, a visualization rule;

determine, based on an analysis of the insight output with respect to the visualization rule, an embellishment associated with the visualization; and insert, based on the classification of the insight output to the visualization, information associated with the determined embellishment into the visualization; and generate, responsive to the user request, the display of the visualization including the information associated with the determined embellishment.

17. The non-transitory computer readable medium of claim 15, wherein intelligence augmentation categories for classifying the refined user request include awareness that includes the user request for information on a past or present portion of a state of a project, alert that includes the user request for information to be provided when a condition based on a portion of the state of the project becomes true, and advice that includes the user request for information related to at least one of an assumed and a hypothetical state of the project, or for an action that is to occur.

18. The non-transitory computer readable medium of claim 15, wherein an insight output for classifying to a visualization of the plurality of visualizations includes an insight output type that represents a format of the insight output, a size of the insight output that includes a number of distinct outputs included in the insight output, and a visualization type that represents a format of the visualization.

19. The non-transitory computer readable medium of claim 18, wherein the machine readable instructions, when executed, further cause the processor to:

classify, based on the insight output type and the size of the insight output, the insight output to the visualization of the plurality of visualizations.

20. The non-transitory computer readable medium of claim 15, wherein the machine readable, when executed, further cause the processor to:

identify, based on an analysis of words of the user request, nodes from a set of nodes of the domain model;

determine, based on an analysis of the words of the user request, a relationship between the identified nodes, wherein the domain model includes edges that represent relationships between each node of the set of nodes;

identify instance values associated with the identified nodes; and utilize the instance values and the determined relationship between the identified nodes to generate a guided query that includes the relevant refinement question associated with the user request.

* * * * *